(12) United States Patent
Hannebauer

(10) Patent No.: US 12,047,112 B2
(45) Date of Patent: Jul. 23, 2024

(54) DECODER CIRCUITS FOR THE TRANSMISSION OF VIDEO MEDIA USING SPREAD SPECTRUM DIRECT SEQUENCE MODULATION

(71) Applicant: HYPHY USA INC., San Jose, CA (US)

(72) Inventor: Robert Steven Hannebauer, Vancouver (CA)

(73) Assignee: HYPHY USA, INC., San Jose, CA (US)

(*) Notice: Subject to any disclaimer, the term of this patent is extended or adjusted under 35 U.S.C. 154(b) by 0 days.

(21) Appl. No.: 18/333,148

(22) Filed: Jun. 12, 2023

(65) Prior Publication Data

US 2023/0327700 A1    Oct. 12, 2023

Related U.S. Application Data

(63) Continuation of application No. 17/686,790, filed on Mar. 4, 2022, now Pat. No. 11,716,114, which is a continuation-in-part of application No. 17/530,321, filed on Nov. 18, 2021, now abandoned.

(60) Provisional application No. 63/118,320, filed on Nov. 25, 2020.

(51) Int. Cl.
*H04B 1/707* (2011.01)
*H04N 19/186* (2014.01)
*H04N 19/423* (2014.01)

(52) U.S. Cl.
CPC ........... *H04B 1/707* (2013.01); *H04N 19/186* (2014.11); *H04N 19/423* (2014.11)

(58) Field of Classification Search
CPC ..... H04B 1/707; H04N 19/186; H04N 19/423
See application file for complete search history.

(56) References Cited

U.S. PATENT DOCUMENTS

| | | | |
|---|---|---|---|
| 3,204,035 | A | 8/1965 | Ballard et al. |
| 3,795,765 | A | 3/1974 | DeGroat et al. |
| 5,793,759 | A | 8/1998 | Rakib et al. |
| 5,796,774 | A | 8/1998 | Kato |
| 5,870,414 | A | 2/1999 | Chaib et al. |
| 5,936,997 | A | 8/1999 | Kanda |
| 5,938,787 | A | 8/1999 | Stark et al. |
| 5,956,333 | A | 9/1999 | Zhou et al. |
| 5,966,376 | A | 10/1999 | Rakib et al. |

(Continued)

FOREIGN PATENT DOCUMENTS

| | | |
|---|---|---|
| CN | 101933277 | 12/2010 |
| CN | 101969319 | 2/2011 |

(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.

(Continued)

*Primary Examiner* — Kabir A Timory
(74) *Attorney, Agent, or Firm* — Beyer Law Group LLP

(57) ABSTRACT

The present invention relates generally to video or other media transmission, and more particularly, to encoding and decoding of video media that has been transmitted between a video source and a video sink using spread spectrum direct sequence (SSDS) modulation.

17 Claims, 18 Drawing Sheets

(56) References Cited

U.S. PATENT DOCUMENTS

| | | | |
|---|---|---|---|
| 6,018,547 A | 1/2000 | Arkhipkin | |
| 6,128,309 A | 10/2000 | Tariki et al. | |
| 6,154,456 A | 11/2000 | Rakib et al. | |
| 6,289,039 B1 | 9/2001 | Garodnick | |
| 6,310,923 B1 | 10/2001 | Lee et al. | |
| 6,456,607 B2 | 9/2002 | Arai et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,710,910 B2 | 5/2010 | Ode et al. | |
| 7,793,022 B2 | 9/2010 | Travers et al. | |
| 7,796,575 B2 | 9/2010 | Lim et al. | |
| 7,873,097 B1 | 1/2011 | Luecke et al. | |
| 7,873,980 B2 | 1/2011 | Horan et al. | |
| 7,908,634 B2 | 3/2011 | Keady et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,325,782 B1 * | 12/2012 | Wright | H04B 1/707 375/295 |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 10,763,914 B2 | 9/2020 | Hannebauer et al. | |
| 11,012,701 B2 | 5/2021 | Zhao et al. | |
| 11,025,292 B2 | 6/2021 | Hannebauer et al. | |
| 11,394,422 B2 | 7/2022 | Hannebauer et al. | |
| 11,463,125 B2 | 10/2022 | Hannebauer et al. | |
| 11,716,114 B2 | 8/2023 | Hannebauer | |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2011/0169870 A1 | 7/2011 | Yang et al. | |
| 2012/0014464 A1 | 1/2012 | Eiger et al. | |
| 2012/0047229 A1 | 2/2012 | Bennett | |
| 2013/0194284 A1 | 8/2013 | Bi | |
| 2014/0218616 A1 | 8/2014 | Toba et al. | |
| 2014/0340431 A1 | 11/2014 | Yamakawa | |
| 2016/0127087 A1 | 5/2016 | Feher | |
| 2019/0174027 A1 | 6/2019 | Lv et al. | |
| 2019/0260629 A1 | 8/2019 | Nikopour et al. | |
| 2019/0342564 A1 | 11/2019 | Kurokawa | |
| 2020/0043440 A1 | 2/2020 | Qiu et al. | |
| 2022/0190873 A1 | 6/2022 | Hannebauer | |
| 2022/0302953 A1 | 9/2022 | Hannebauer et al. | |
| 2022/0397931 A1 | 12/2022 | Song et al. | |
| 2023/0223981 A1 | 7/2023 | Hannebauer | |
| 2023/0230559 A1 | 7/2023 | Friedman | |

FOREIGN PATENT DOCUMENTS

| | | |
|---|---|---|
| CN | 101917209 | 7/2015 |
| EP | 0 727 881 | 8/1996 |
| EP | 1 079 536 | 2/2001 |
| EP | 1 968 324 | 9/2008 |
| JP | 08293818 | 11/1996 |
| JP | H09312590 | 12/1997 |
| JP | 2001-144653 | 5/2001 |
| JP | 2001156861 | 6/2001 |
| JP | 2001510658 | 7/2001 |
| JP | 2002281545 | 9/2002 |
| JP | 2007-150971 | 6/2007 |
| JP | 2011003331 | 6/2011 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

International Search Report dated Dec. 12, 2016 from International Application No. PCT/AU2016/050880.

Extended European Search Report dated May 14, 2019 from European Application No. 16847645.5.

Chinese Office Action dated Jan. 6, 2020 from Chinese Application No. 201680046615.5.

Extended European Search Report dated Feb. 22, 2022 from European Application No. 21209666.3.

International Search Report & Written Opinion dated May 6, 2022 from International Application No. PCT/US2021/059966.

* cited by examiner

Encoding of Analog Values

Encoding of Digital Values

DECODER CIRCUITS FOR THE TRANSMISSION OF VIDEO MEDIA USING SPREAD SPECTRUM DIRECT SEQUENCE MODULATION

CROSS-REFERENCE TO RELATED APPLICATIONS

This application is a continuation of U.S. application Ser. No. 17/686,790 filed Mar. 4, 2022, entitled "Encoder and Decoder Circuits for the Transmission of Video Media Using Spread Spectrum Direct Sequence Modulation", which in turn is a continuation-in-part of U.S. application Ser. No. 17/530,321 filed on Nov. 18, 2021, entitled "Encoder and Decoder Circuits for the Transmission of Video Media Using Spread Spectrum Direct Sequence Modulation", which in turn claims priority to U.S. provisional application No. 63/118,320 filed on Nov. 25, 2020, entitled "Encoder and Decoder Circuits for the Transmission of Video Media Using Spread Spectrum Direct Sequence Modulation", which are all incorporated herein for all purposes.

This application also incorporates by reference U.S. application Ser. No. 17/530,321 filed on Sep. 21, 2016, entitled "System For Transporting Sampled Signals Over Imperfect Electromagnetic Pathways", U.S. application Ser. No. 16/494,901 filed on Mar. 21, 2018, entitled "Transporting Sampled Signals Over Multiple Electromagnetic Pathways" and U.S. application No. 63/232,486 filed on Aug. 12, 2021, entitled "Conveying Sampled Signals Over Electromagnetic Pathways".

BACKGROUND

The present invention relates generally to video and/or other media transport, and more particularly, to encoding and decoding of video media for transmission between a video source and a video sink.

High definition video is typically generated in a number of different formats, including "720p", "1080i", "1080p" and more recently "4K". With these formats, "i" refers to interlaced scanning and "p" refers to progressive scanning.

The amount of video data transmitted using any of the above-listed formats is enormous. With "720p" the transmission rate is 1280 horizontal lines by 720 vertical lines or approximately 921,600 pixels per frame with a typical refresh rate of 50 or 60 frames per second. The transmission of 1080i requires transmission of 1920 horizontal lines by 540 vertical lines, or 1,036,800 pixels per field, with two interlaced fields making up each frame, with a refresh rate ranging from 12.5 to 60 fields per second. The transmission of 1080p involves 1920 horizontal lines by 1080 vertical lines, or 2,073,600 pixels per frame, and typically a refresh rate ranging from 30 to 60 frames per second. 4K video transmission involves 3840 horizontal lines by 2160 vertical lines per frame with a typical refresh rate of 30 or 60 frames per second.

Given the huge amount of bandwidth needed for the transmission of video, various types of video compression are typically used, such as MPEG, AVC, and HEVC. The problems with video compression include limited interoperability, increased implementation cost, added latency, and reduced image fidelity. As a result, some degree of picture quality is degraded when displaying compressed video versus uncompressed or visually lossless video.

The magnitude of the above-described problems will become significantly worse in the near future. Consumer electronics companies are now introducing 8K cameras and displays into the market. 8K devices have a frame size of 7680 horizontal lines and 4320 vertical lines, or 33,177,600 pixels per frame, and a refresh rate of typically either 120 or 240 frames per second. The transmission of 8K video will therefore make an already existing set of challenges significantly more difficult.

A video transport capable of transmitting high-quality, high-definition video that is not compressed is therefore needed.

SUMMARY

The present invention is directed to encoding and decoding circuits for video media that is transmitted between a video source and a video sink using an improved Spread Spectrum Direct Sequence (SSDS)-based modulation.

In one non-exclusive embodiment, an encoder circuit and method for applying a set of mutually-orthogonal SSDS codes to video data is described, where "L" is a parameter defined as the length of codes used in a codebook. The method and encoder circuit involve (a) constructing a video vector including N samples of first and second voltage values, the N samples derived from multiple sets of samples representative of multiple pixels respectively, (b) modulating each of the first and the second voltage values of the N samples in the video vector using L SSDS chips each from its respective code, each of the modulations involving conditionally either inverting or not inverting the first and second voltage values of the N samples depending on the state of the L corresponding SSDS chips respectively, and (c) generating a sequence of L differential level output signals, each one from an accumulation of the modulated first and second voltage values of the N samples that are conditionally either inverted or not inverted.

In another non-exclusive embodiment, a decoder circuit and method for applying the same set of mutually-orthogonal SSDS codes to decode the L differential level signals into N samples is described. The method and circuit involve (a) receiving the series of L differential level signals, (b) providing each received differential level signal to N decoder circuits, (c) providing N Spread Spectrum Direct Sequence (SSDS) chips from the corresponding codes to the N decoder circuits respectively, each of the N SSDS chips having either a first state or a second state, (d) for each of the N decoder circuits, demodulating by conditionally inverting or not inverting the differential level signals depending on whether the SSDS chip provided to each of the N decoder circuits is of the first state or the second state respectively, (e) for each of the N decoder circuits, accumulating the inverted or not inverted differential level signals at first and second storage locations; and (f) after L demodulation steps (d) and (e), presenting the N reconstructed samples, the N samples retrieved from the inverted or not inverted differential level signals stored at the first and the second storage locations of each of the N decoder circuits respectively.

In yet other non-exclusive embodiments, a decoder circuit and method is described for generating a sample video signal by decoding (L) signals of encoded video media using SSDS coding by generating an average voltage value derived from averaging voltage values stored on (L) storage devices arranged in a first bank, the (L) voltage values derived from multiplying the (L) signals with (L) SSDS chip values respectively.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
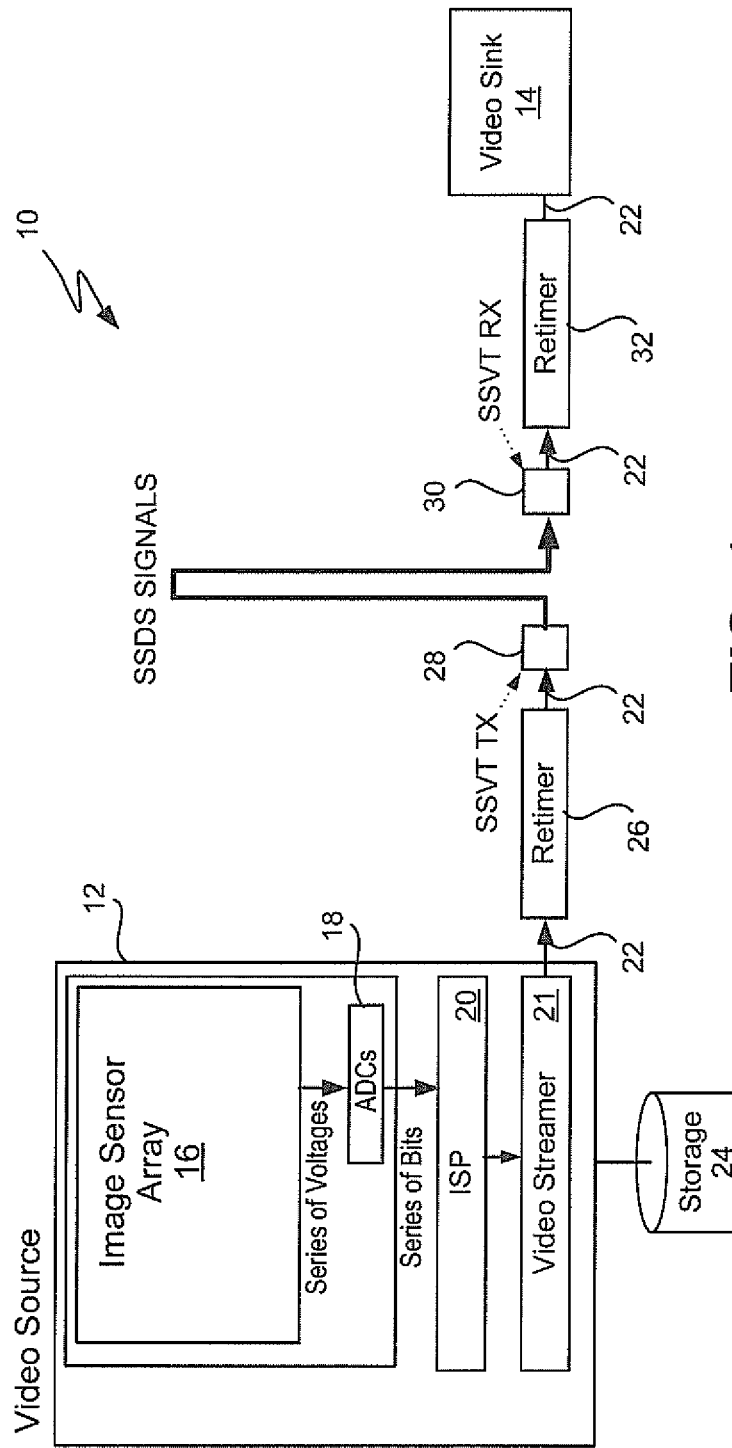
FIG. 1 is a system diagram illustrating transmission of electromagnetic (EM) video signals from a digital video source to a digital video sink using Spread-Spectrum Video Transport (SSVT)) in accordance with a non-exclusive embodiment of the invention.

The following description recites various aspects and embodiments of the inventions disclosed herein. No particular embodiment is intended to define the scope of the invention. Rather, the embodiments provide non-limiting examples of various apparatus' and methods that are included within the scope of the claimed inventions. The description is to be read from the perspective of one of ordinary skill in the art. Therefore, information that is well known to the ordinarily skilled artisan is not necessarily included.

Code Division Multiple Access (CDMA)

Code Division Multiple Access (CDMA) is a well-known channel access protocol that is commonly used for radio communication technologies, including cellular. CDMA is an example of multiple access, wherein several discrete transmitters from different locations can send information simultaneously over a single communication channel. In telecommunications applications, CDMA allows multiple users using different telephones to share a given frequency band without interference from other users. CDMA employs Spread Spectrum Direct Sequence (SSDS), an encoding which relies on unique, orthogonal codes to encode each user's data. By using unique codes, the transmission of the multiple users can be combined and sent without interference between the users. On the receive side, the same unique or orthogonal codes are used for each user to demodulate the transmission, recovering the data of each user respectively. The present invention improves upon the CDMA protocol.

Spread Spectrum Direct Sequence (SSDS) Modulation

SSDS is a modulation technique by which a signal (e.g., a series of electrical or electromagnetic values) in a particular bandwidth is deliberately spread using an orthogonal code, resulting in a signal with a wider bandwidth. The wider bandwidth signal is then transmitted over a transmission medium. On the receive side, the wide bandwidth signal is demodulated using the same orthogonal code used for modulation on the transmit side. As a result, the original electrical or electromagnetic signal is recovered.

The present invention is directed to circuits for encoding and decoding video media that is transmitted between a video source and a video sink using a spread spectrum direct sequence (SSDS)-based improved modulation. During operation, a stream of time-ordered video samples containing color values and pixel-related information is received from the video source and reconstructed for the video sink. As described in more detail below, the number and content of input video samples received from the video source depends on the color space in operation at the source. Regardless of which color space is used, each video sample is representative of a sensed or measured amount of light in the designated color space. As the stream of input video samples is received, the input video samples are repeatedly (1) distributed by assigning the input video samples into encoder input vectors according to a predetermined permutation and (2) encoded by applying an SSDS-based modulation to each of the multiple encoder input vectors, applying orthogonal codes, to generate multiple composite EM signals with noise-like properties. The EM signals are then (3) transmitted over a transmission medium, such as an HDMI cable. On the receive side, (4) the incoming EM signals are decoded by applying an SSDS-based demodulation, applying the same orthogonal codes, to reconstruct the samples into output vectors and then (5) the output vectors are collected by assigning the reconstructed video samples from the output vectors to an output stream using the inverse of the predetermined permutation. As a result, the original stream of time-ordered video samples containing color and pixel-related information is conveyed from video source to video sink.

Referring to FIG. 1, a system 10 illustrating transmission of electromagnetic (EM) video signals from a digital video source to a digital video sink using a spread spectrum direct sequence (SSDS)-based improved modulation in accordance with a non-exclusive embodiment of the invention is shown.

In the discussion below, a process is described of how digital video data is typically captured. Once captured, the digital video data can be transmitted to a video display for near real-time consumption. On the other hand, the captured video data can be stored for later consumption in a time-shifted mode. In either case, it is proposed herein that an SSDS-based improved modulation be used to transmit the digital video data from the video source (or storage device) to a video sink for display (or storage).

Video Capture

The video source 12 includes an image sensor array 16, one or more analog-to-digital converters 18, an Image Signal Processor (ISP 20), and a video streamer 21 responsible for generating a stream of video samples 22. The video source 12 may also optionally be connected to a video media storage device 24. The storage device may be either proximate to the location of the image sensor array 16 or remote.

In various embodiments, the video source 12 can be any device capable of capturing imaging information, such as but not limited to a video camera, an Infrared imaging device, an ultrasound imaging device, a magnetic resonance imaging (MRI) device, computed tomography, or just about any other type of imaging device capable of generating video information.

The image sensor 16 is any device capable of generating an electronic signal that is proportional to an amount of measured light. For example, in a non-exclusive embodiment, the image sensor is a planar array of photodiodes. Each photodiode represents a pixel sample location in the planar array. The number of photodiodes in the planar array may widely vary and is dependent on the size of the image sensor 16. A "4K" imaging sensor, for instance, includes a photodiode array of 3840 horizontal lines by 1080 vertical lines, or a total of 4,147,200 photodiodes. An 8K imaging sensor will have 7680 horizontal lines and 4320 vertical lines, or 33,177,600 pixels per frame. It should be understood that 4K and 8K are merely examples of resolution and the image sensor 16 may be any size, including less than 480, 480, 720, 1080, 4K, 8K. The number of photodiodes in the array will of course vary accordingly.

During operation, the image sensor 16 continually repeats a sensing interval at a given refresh rate. During each sensing interval, each photodiode in the array generates for every pixel position an electrical voltage that is inversely proportional to the number of photons generated the photodiode. As a result, the array of photodiodes generates a set of voltages that collectively represent a frame. As the image sensor is continually refreshing at a given frame rate, multiple sets of voltages, each representing a frame, are continuously generated one after another.

For each pixel position, the photodiode is provided between a capacitor and ground. Just prior to a sensing interval, the capacitor is pre-charged. When sensing, the photodiode generates a current that is proportional to the magnitude of light received. When little to no light is sensed, there is little to no capacitor discharge to ground through the photodiode. Conversely, if a large amount of light is sensed, then a large portion of the voltage on the capacitor is discharged. The voltage remaining on the capacitor following the exposure interval is therefore inversely proportional to the magnitude of the sensed light.

With many digital image sensor arrays 16, there is typically a row of analog-to-digital converters ("ADCs") 18, with one ADC per column. During a given frame interval, all the rows of the array 16 are sampled, typically one after the other from top to bottom, sometimes referred to herein as "row-major" order. With each sample, the ADCs 18 convert the sensed voltage into a digital value for the pixel position for each column in the array. A frame is complete when all the rows of the array 16 have been sampled. The above process it is repeated, in row-major order, on a frame-by-frame basis. The net result is a string of digital values, with each digital value representative of a pixel position in a frame. Again, the size of the image sensor and the refresh rate are determinative of the number of digital values per frame. For example, a 4K or an 8K digital image sensor will measure 8,294,400 or 33,177,600 digital samples per frame, respectively.

The number of bits used to represent each sample may widely vary. For instance, each voltage may be converted by the analog-to-digital converters 18 into an 8- or 10-bit value. It should be understood that such bit values listed herein are merely illustrative and the number of bits used to represent the pixel voltage values may be more or less than 8 or 10.

The image sensor array 16 can be either monochromatic or color. In the case of the former, the digital values generated by the ADCs 18 are representative of only one color. With the latter, well known color techniques such as Bayer filtering is typically applied. With Bayer filtering, the individual photodiodes 16 are selectively covered with filters of a predetermined color (e.g., either Red (R) or Blue (B) or Green (G)). In alternative embodiments, CYGM (Cyan, Yellow, Green and Magenta) or CMY (Cyan, Magenta and Yellow) filtering may be used. Regardless of the type of filter used, the magnitude of the filtered light is measured at each sample position.

The ISP 20 is arranged to interpolate the string of digital values received from the ADC 18. By interpolation, the ISP 20 takes the information contained in the digital values for each pixel measurement and its geometric neighborhood and defines an estimate of the color of the corresponding pixel. To output full-color images in a specific color space (there are many), the ISP 20 interpolates the "missing" color values at each location. That is, given only a single-color measurement per pixel, the ISP algorithmically estimates the "missing" color values to create, for example, an RGB or YCbCr representation for the pixel. The ISP 20 thus generates a set of samples 22 for a given pixel of a given frame, each set of samples 22 representative of the color values (either as measured and/or interpolated) for a given pixel position within the frame.

The contents of a given set of samples 22 may vary since there are many ways to represent color. In different embodiments, the information contained in each set of samples 22 may therefore vary. Generally, RGB is considered full color, and other spaces such as YCbCr are approximations to full color that are smaller to transmit. RGB provides three color values. With YCbCr, Y is the luminance component and Cb and Cr are the blue-difference and red-difference chroma values, respectively. YCbCr color spaces are defined by a mathematical coordinate transformation from an associated RGB color space. In yet another way to represent color, an "alternating" approach can be used. For example, every second pixel is represented by its Luminance(Y) value, while alternating pixels are represented by either Cb (Blue) or Cr (Red) values. Accordingly in various embodiments, each set of samples 22 includes some number "S" of sample values that are transmitted in parallel. With RGB, the number of samples per set of samples 22 is S=3, while for YCbCr, S=2.

The video streamer 21 in response generates a sequence of time-ordered sets of samples 22. In general, each set of samples 22 output together represents the light measurement for one pixel location on the array 16. The values and/or number of samples produced by the ISP per pixel location depends on the ISP implementation and, in particular, on the color space applied.

The output of the video streamer 21 is a continuous stream of time-ordered sets of samples 22, each representative of a pixel in a row, from left to right, in row-major order, frame after frame, so long as the array 16 is sensing. The stream of sets of samples 22 is then processed, after transmission, by the video sink 14 to reconstruct the images sensed, frame-by-frame, by the image array sensor 16.

In another optional embodiment, the stream of sets of samples 22 can be stored in a storage device 24. In this way, the stream of sets of samples 22 can be transmitted at any time after the video stream was initially captured by the image sensor 16. For instance, the stream of sets of samples 22 can be captured during one time interval and then either transmitted to the video sink 14 frame by frame for display and/or stored in storage unit 24 for transmission to the video sink 14 at some later point in time. In this manner, the video captured by the video source 12 can be displayed by the video sink 14 in a time-shifted manner.

An advantage for using SSVT in the context of image capture and display is that images are measured on intrinsically error-prone sensors and displayed on intrinsically noisy LED arrays and viewed by extremely complex and robust human vision systems. As a result, the communication requirements for video are very different from the communication requirements for conventional digital artifacts such as spreadsheets and electronic mail, wherein bit-perfect transmission is required. However, conventional video transmission treats a video signal just like another kind of (digital) document. With SSVT, however, video signals are transmitted in an electrically robust manner. Among the advantages of SSVT is the fact that any uncompensated errors occurring in the EM signal measurement at the receiver manifest in the reconstructed images as broad-spectrum temporal and spatial noise. Such white noise is more palatable to human cognition than are the blank screens, repeated images, and blocky compression artifacts that arise from conventional bit-serial transmission.

Transmission

FIG. 1 further includes a transmit retimer 26 and a Spread Spectrum Video Transport (SSVT) transmitter (TX) 28 on the transmit side. As explained in greater detail below, the retimer 26 is responsible for decoding or exposing the color component information (e.g., RGB values) from each of the sets of samples 22 in the stream generated by the video streamer 21. The SSVT 28 is then responsible for (a) distributing the set of samples 22 into one of multiple encoder input vectors using a predetermined permutation, and (b) applying SSDS-based modulation to each of the multiple encoder input vectors and (c) encoding the multiple input vectors to generate sequences of EM level signals, and (d) then transmitting the sequences of EM level signals over multiple EM pathways on a transmission medium, such as an HDMI cable, towards the video sink 14.

On the receive side, a SSVT receiver (RX) 30, a retimer 32 and a video sink 14 are provided. The function of the SSVT receiver (RX) 30 and the retimer 32 are the complement of the retimer 26 and SSVT transmitter 28 on the transmit side. That is, the SSVT receiver RX 30 (a) receives the sequences of EM level signals from the multiple EM pathways of the transmission medium, (b) decodes each sequence by an applying SSDS-based demodulation to reconstruct the video samples in multiple output vectors, and (c) collects the samples from the multiple output vectors into a reconstruction of the original stream of sets of samples 22 using the same permutation used to distribute the input samples into input vectors on the transmit side. The retimer 32 then transforms the reconstructed output samples into a format that is suitable for display by the video sink 14 or for storage on the receive side for display in a time-shifted mode. The number of output sample values S in each set of samples 22 is determined by the color space applied by the video source. With RGB, S=3, and with YCbCr, S=2. In other situations, the sample values S in each set of samples 22 can be less than two (i.e., just one or more than three).

The SSDS-based improved modulation and demodulation, as described herein, is performed in the analog or electromagnetic ("EM") domain. As explained in more detail below, the stream of sets of input samples 22 are distributed at a first clock rate (pix-clk) to create encoder input vectors according to a predetermined permutation. SSDS-based modulation is then applied to each of the encoder input vectors, resulting in the generation of an encoded "EM" signal for each encoder input vector. The EM signals are then transmitted over the transport in parallel at a second clock rate (SSVT_clk). Applying spreading (SSDS) to each sample in the encoder input vectors provides electrical resiliency, but at the expense of bandwidth per sample. However, by modulating a set of mutually-orthogonal codes and transmitting all of the resultant EM signals simultaneously, some or all of the lost bandwidth is recovered.

Figure 2A:
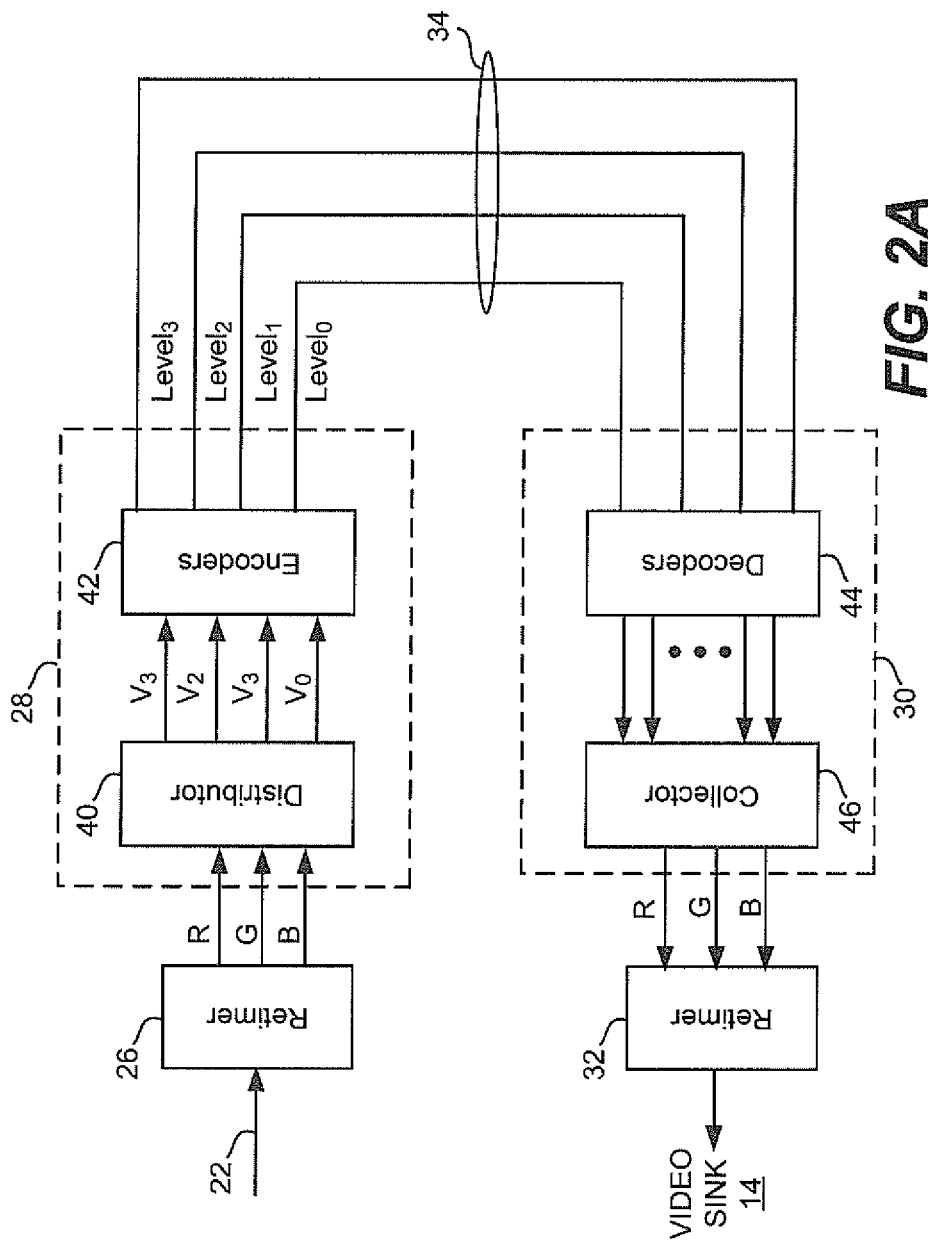
FIG. 2A is a logic block diagram of a Spread Spectrum Video Transmission (SSVT) transmitter and SSVT receiver connected by a transmission cable in accordance with a non-exclusive embodiment of the invention.

FIG. 2A is a logic block diagram of the SSVT transmitter 28 and SSVT receiver 30 connected by a transmission medium 34. The SSVT transmitter 28 includes a distributor 40 and multiple encoders 42. The SSVT receiver 30 includes multiple decoders 44 and a collector 46.

On the transmit side, the distributor 40 of the SSVT receiver 30 is arranged to receive the color information (e.g., R, G, and B values) exposed in the input sets of samples 22. In response, the distributor 40 takes the exposed color information for the incoming sets of samples 22 and builds multiple encoder input vectors according to a predefined permutation. In the non-exclusive embodiment shown in FIG. 2A, there are four encoder input vectors ($V_0$, $V_1$, $V_2$ and $V_3$), one for each of four EM pathways on the transmission medium 34 respectively. In various embodiments, the transmission medium 34 can be a cable such as HDMI, fiber optic or wireless. One of the multiple encoders 42 is assigned to one of the four vectors $V_0$, $V_1$, $V_2$ and $V_3$ respectively. Each encoder 42 is responsible for encoding sample values contained in the corresponding encoder input vector and generating an EM signal that is sent over one of the parallel pathways on the transmission medium 34.

In this particular embodiment shown, there are four EM pathways, and the four encoders 42 each generates an EM signal for each of the four pathways respectively. It should be understood, however, the present invention should be by no means be limited to four pathways. On the contrary, the number of pathways on the transmission medium 34 may widely range from one to any number more than one, including more than four.

Permutation Example

Figure 2B:
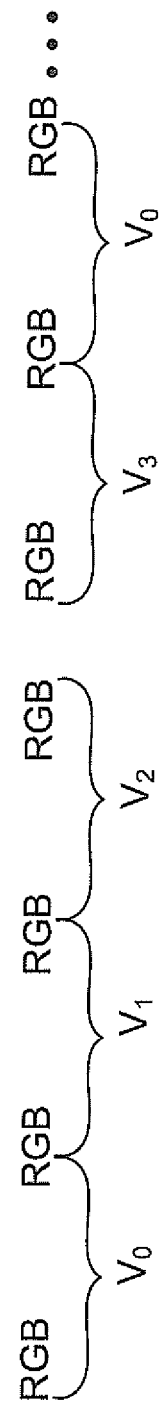
FIG. 2B is a diagram of one possible permutation of video signals into vectors that are then modulated before transmission in accordance with a non-exclusive embodiment of the invention.

Referring to FIG. 2B, a diagram of one possible permutation implemented by the distributor 40 for building four vectors $V_0$, $V_1$, $V_2$ and $V_3$ is shown. Each of the vectors includes N samples of color information.

In this non-exclusive embodiment, the exposed color information for the sets of samples 22 is "RGB" respectively. The exposed RGB samples of the sets of samples 22 in this example are assigned to vectors $V_0$, $V_1$, $V_2$ and $V_3$ from left to right. In other words, the "R", "G" and "B" values of the left most sample and the "R" signal of the next set of samples 22 are assigned to vector $V_0$, whereas the next (from left to right) "G", "B", "R" and "G" values of the next sample 22 are assigned to vector $V_1$, the next (from left to right) "B", "R", G" and "B" values are assigned to vector $V_2$, and the next (from left to right) "R", "G", "R" and "R" values are assigned to vector $V_3$. Once the fourth vector $V_3$ has been assigned its signals, the above process is repeated until each of the four vectors $V_0$, $V_1$, $V_2$ and $V_3$ have N samples. In various embodiments, the number of N samples may widely vary.

By way of example, consider a non-exclusive embodiment with N=60. In this case, the total number of N samples included in the four vectors $V_0$, $V_1$, $V_2$ and $V_3$ is 240 (60×4=240). The four encoder input vectors $V_0$, $V_1$, $V_2$ and $V_3$, when completely built up, include the samples (where S=3) for 80 distinct sets of samples 22 (240/3=80). In other words:

Vector $V_0$ includes Samples $P_0$, $N_0$ through $P_0$, $N_{N-1}$;
Vector $V_1$ includes Samples $P_1$, $N_0$ through $P_1$, $N_{N-1}$;
Vector $V_2$ includes Samples $P_2$, $N_0$ through $P_2$, $N_{N-1}$; and
Vector $V_3$ includes Samples $P_3$, $N_0$ through $P_3$, $N_{N-1}$.

It should be understood that the above example is merely illustrative and should not be construed as limiting in any regard. The number of samples N may be more or less than 60. Also, it should be understood that (a) the exposed color information for each set of samples 22 can be any color information (e.g., Y, C, Cr, Cb, etc.) and is not limited to RGB.

The number of EM pathways over the transmission medium 34 can also widely vary. Accordingly, the number of vectors V and the number of encoders 42 may also widely vary from just one to any number larger than one.

It should also be understood that the permutation scheme used to construct the vectors, regardless of the number, is arbitrary. Any permutation scheme may be used, limited only by whichever permutation scheme that is used on the transmit side is also used on the receive side.

Figure 3:
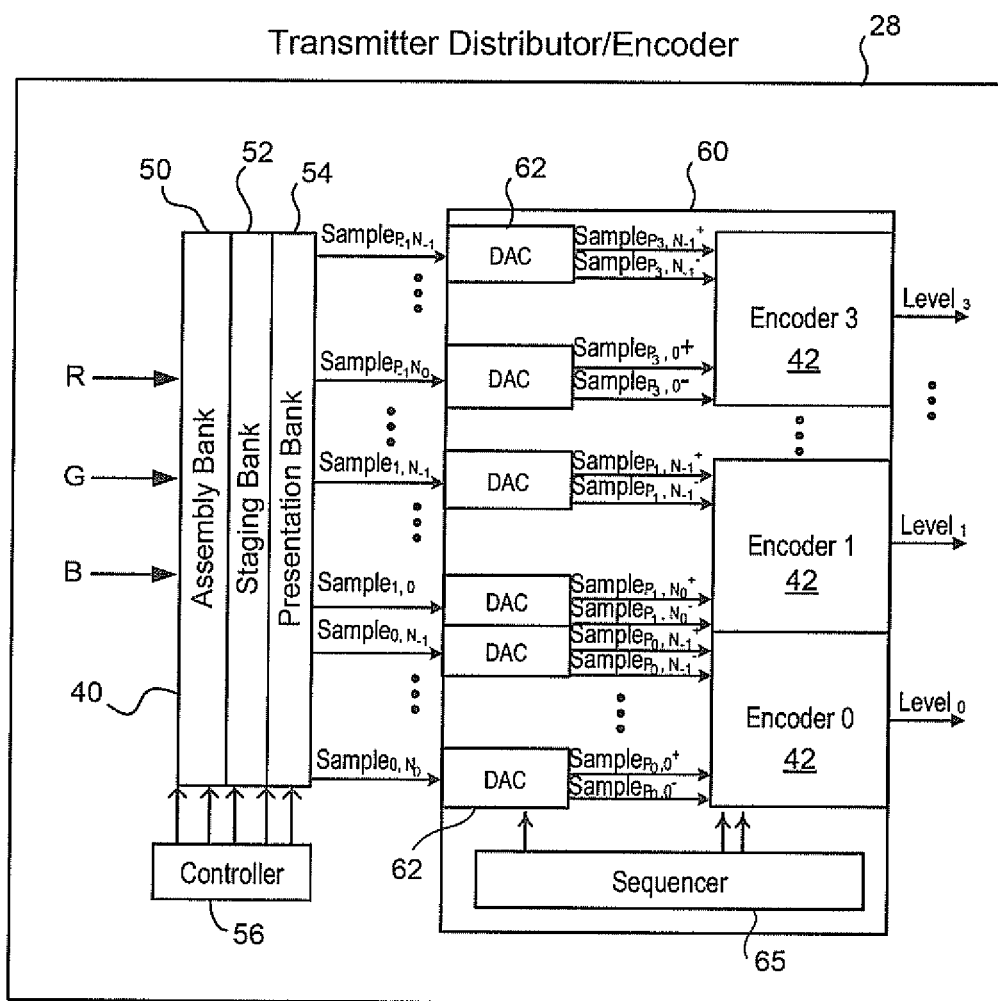
FIG. 3 is a logic block diagram of an encoder-distributor used in the SSVT transmitter in accordance with a non-exclusive embodiment of the invention.

Referring to FIG. 3, a logic block diagram of the SSVT transmitter 28 is illustrated. The distributor-encoder 40 includes an assembly bank 50, a staging bank 52, a presentation bank 54 and a frame controller 56. An encoder block 60 includes a bank of Digital-to-Analog converters (DACs) 62 and four encoders 42, one for each EM pathway on the transmission medium 34.

The distributor 40 is arranged to receive the exposed color information (e.g., RGB) for the stream of sets samples 22, one after the other. In response, the assembly bank 50 builds the four vectors $V_0$, $V_1$, $V_2$ and $V_3$ from the exposed color information (e.g. RGB) for the incoming stream of sets of samples 22. As the sets of samples 22 are received, they are stored in the assembly bank 50 according to the predetermined permutation. Again, the distributor 40 may use any number of different permutations when building the vectors containing N samples each.

The staging bank 52 facilitates the crossing of the N samples of each of the four vectors $V_0$, $V_1$, $V_2$ and $V_3$ from a first clock frequency or domain used by the retimer 26 into a second clock frequency or domain used for the encoding and transmission of the resulting EM level signals over the transmission medium 34. As previously discussed in the example above with N=60 and S=3, the samples representing exactly 80 sets of RGB samples are contained in the four encoder input vectors $V_0$, $V_1$, $V_2$ and $V_3$.

In various embodiments, the first clock frequency can be faster, slower or the same as the second clock frequency. The first clock frequency f_pix is determined by the video format selected by the video source 12. The second clock frequency f_ssvt is a function of f_pix, the number P of EM pathways in the transmission medium 34, the number S of samples in each set of input/output samples, and the SSVT transform parameters N (the number of input/output vector locations) and L (the length of each SSDS code), where f_ssvt= (f_pix*S*L)/(P*N). With this arrangement, the input clock (pix_clk) oscillates at one rate, the SSVT clock (ssvt_clk) oscillates at a different rate. They can be the same or different. The spreading arises because N input samples (individual color components) are assigned to an input vector; then the encoder performs the forward transform while the next input vector is prepared.

The presentation bank 54 presents the N samples ($N_0$ through $N_{-1}$) of each of the four encoder input vectors $V_0$, $V_1$, $V_2$ and $V_3$ to the encoder block 60.

The controller 56 controls the operation and timing of the of the assembly bank 50, the staging bank 52, and the presentation bank 54. In particular, the controller is responsible for defining the permutation used and the number of samples N when building the four encoder input vectors $V_0$, $V_1$, $V_2$ and $V_3$. The controller 56 is also responsible for coordinating the clock domain crossing from the first clock frequency to the second clock frequency as performed by the staging bank 52. The controller 56 is further responsible for coordinating the timing of when the presentation bank 54 presents the N samples ($N_0$ through $N_{-1}$) of each of the encoder input four vectors $V_0$, $V_1$, $V_2$ and $V_3$ to the encoder block 60.

Within the encoder block 60, a plurality of Digital-to-Analog Converters (DACs) 62 is provided, each arranged to receive one of the P*N samples (P0, $N_0$ through $P_3$, $N_{N-1}$) assigned to the four encoder input vectors $V_0$, $V_1$, $V_2$ and $V_3$ collectively. Each DAC 62 converts its received sample from the digital domain into a differential pair of voltage signals having a magnitude that is proportional to its incoming the digital value. In a non-exclusive embodiment, the output of the DACs 62 range from a maximum voltage to a minimum voltage.

The four encoders 42 are provided for the four encoder input vectors $V_0$, $V_1$, $V_2$ and $V_3$ respectively. Each encoder 42 receives the differential pair of signals for each of the N samples ($N_0$ through $N_{-1}$) for its encoder input vector, modulates each of the N differential pair of voltage signals using an SSVT "chip" of an orthogonal code, accumulates the modulated values and then generates a differential EM level output signal. Since there are four encoders 42 in this example, there are EM level signals (Level$_0$ through Level$_3$) that are simultaneously transmitted over the transmission medium 34.

A sequencer circuit 65 coordinates the timing of the operation of the DACs 62 and the encoders 42. The sequencer circuit 65 is responsible for controlling the clocking of the DACs 62 and the encoders 42. As described in detail below, the sequencer circuit 65 is also responsible for generating two clock phase signals, "clk 1" and "clk 2", that are responsible for controlling the operation of the encoders 42.

Figure 4:
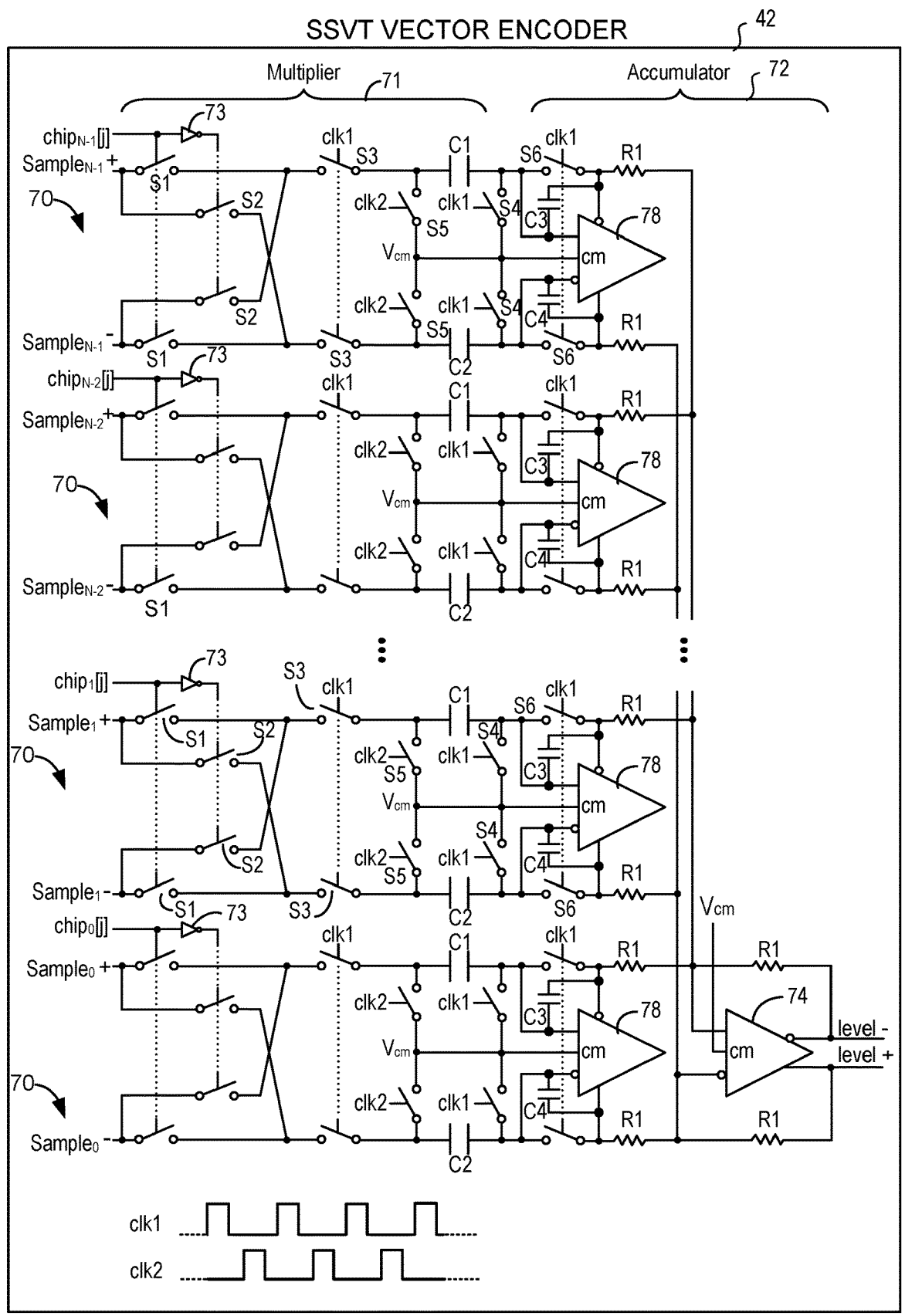
FIG. 4 is a circuit diagram of an SSVT encoder in accordance with a non-exclusive embodiment of the invention.

Referring to FIG. 4, a circuit diagram of an encoder 42 for one of the input vectors V is illustrated. The encoder circuit 42 includes a multiplier stage 71 with a plurality of multiplier stages 70 and an accumulator stage 72 that includes a differential amplifier 74.

Each multiplier stage 70 is arranged to receive at first (+) and second (−) terminals a differential pair of sample signals (+Sample$_{N-1}$/−Sample$_{N-1}$ through+Sample$_0$/−Sample$_0$) from one of the DACs 62 respectively. Each multiplier stage 70 also includes a terminal to receive a chip from a code, an inverter 73, sets of switches S1-S1, S2-S2 and S3-S3, sets of switches driven by clk 1 and clk 2, and storage devices C1 and C2 of equal value that each store a voltage sample when subjected to the various switches, thus storing differing voltages across each device at different times according to the switching sequence.

During operation, each multiplier stage 70 modulates its received differential pair of analog signals by conditionally multiplying by either (+1) or (−1), depending on a value of a received chip. If the chip is (+1), then when clk 1 is active, switch pairs S1-S1 and S3-S3 close, while switch pair S2-S2 remain open. As a result, both the differential pair of +/− samples are stored on the storage devices C1 and C2 without any inversion (i.e., multiplied by +1) respectively. On the other hand, if the chip is (−1), then the complement of the above occurs. In other words, switch pair S1-S1 opens and switch pair S2-S2 closes, and pair S3-S3 closes when clk 1 is active. As a result, the differential pair of samples are switched and stored on C1 and C2, respectively, thus effecting multiplication by −1.

The accumulator stage 72 operates to accumulate the charges on the storage devices C1 and C2 for all of the multiplier stages 70. When clk 1 transitions to inactive and clk 2 transitions to active, then all the clk 1 controlled switches (S3-S3, S4-S4) open and the clk 2 controlled switches (S5-S5, S6-S6) close. As a result, all the charges on the first storage devices C1 of all the multiplier stages 70 are amplified by amplifiers 78 and accumulated on a first input of the differential amplifier 74, while all the charges on the second storage devices C2 of all the multiplier stages 70 are amplified by amplifiers 78 and accumulated on a second input of the differential amplifier 74. In response, the differential amplifier 74 generates a pair of differential electromagnetic (EM) level signals. Amplifier 74 may use the same Vcm as amplifier 78 to its immediate left. Depending upon the implementation, the resistors R1 shown for each amplifier 78 and 74 may be the same or different, and the resistors R1 of amplifier 74 may be the same or different from those of amplifiers 78. Capacitors C1, C2, C3 and C4 should be of the same size.

The above process is performed for all four vectors V$_0$, V$_1$, V$_2$ and V$_3$. In addition, the above-described process is continually repeated so long as the stream of sets of samples 22 is received by the SSVT transmitter 28. In response, four streams of differential EM output level signals are transmitted to the SSVT receiver 30 over the transmission medium 34.

Receiver

On the receive side, the SSVT RX 30 is responsible for decoding the stream of four differential EM level output signals received over the transmission medium 34 back into a format suitable for display. Once in the suitable format, the video content (e.g., signals S) contained in the samples 22 can be presented on a video display, frame after frame. As a result, the video capture by the video source 12 can be re-created by the video sink 14. Alternatively, the decoded video information can be stored for display at a later time in a time shifted mode.

The SSVT RX 30 performs the inverse of the SSVT TX 28 on the transmit side. The SSVT RX 30 uses four decoders 80 and a collector 46. The decoders 80 reconstruct the four differential EM level output signals into four decoder output vectors. The collector 46 then assigns the samples of the decoder output vectors to the original stream of sets of samples 22, which each include S reconstructed samples corresponding to the original S samples at that location in the stream.

Figure 5A:
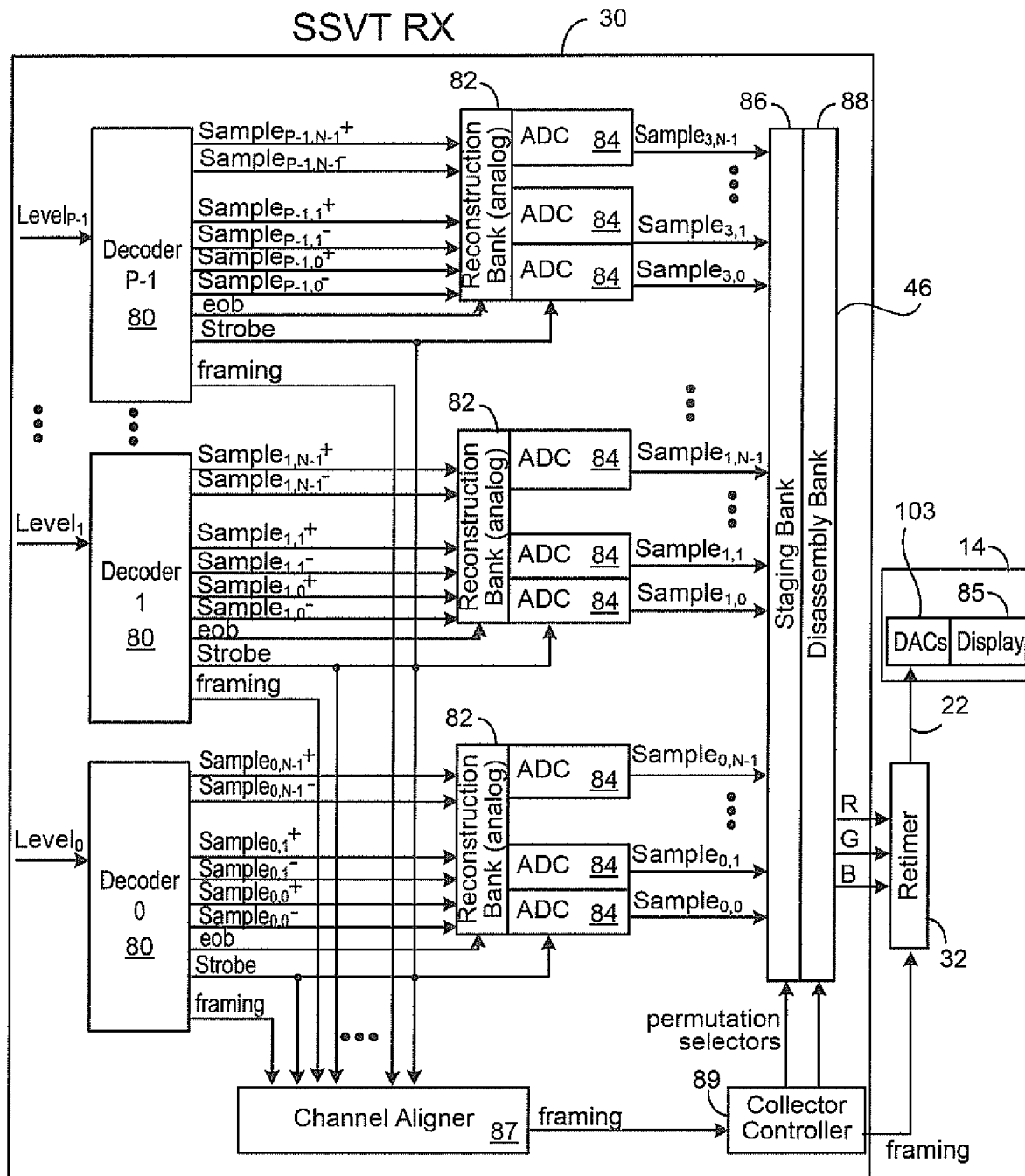
FIG. 5A is a logic block diagram illustrating a receiver assembly for de-modulating P received differential pairs of EM level signals back into HDMI signals in accordance with a non-exclusive embodiment of the invention.

Referring to FIG. 5A, a detailed block diagram of the SSVT RX 30, retimer 32 and a video display 85 of the video sink 14 is illustrated. The P decoders 80 (labeled 0 through P-1) are arranged to receive differential EM level signals Level$_0$ through Level$_{P-1}$ respectively. In response, each of the decoders 80 generates N differential pairs of reconstructed samples (Sample$_0$ through Sample$_{N-1}$). In the case where there are four decoders 80 (P=4), four vectors V$_0$, V$_1$, V$_2$ and V$_3$ are constructed respectively.

Reconstruction banks 82 sample and hold each of the differential pairs of N reconstructed samples (Sample$_0$ through Sample$_{N-1}$) for each of the four decoder output vectors V$_0$, V$_1$, V$_2$ and V$_3$ at the end of each decoding interval respectively. An Analog-to-Digital Converter (ADC) 84 is provided for each of the N samples (Sample$_0$ through Sample$_{N-1}$) for each of the four vectors V$_0$, V$_1$, V$_2$ and V$_3$ respectively. Each ADC converts its received differential pair of voltage signals into a corresponding digital value, resulting in digital samples (Sample$_{N-1}$ through Sample$_0$) for each of the four vectors V$_0$, V$_1$, V$_2$ and V$_3$ respectively. The ADCs operate at a clock rate=f_ssvt/L.

The collector 46 includes a staging bank 86 and a disassembly bank 88. The staging bank 86 receives all the reconstructed samples (N$_{n-1}$ through N$_0$) for each of the four decoder output vectors V$_0$, V$_1$, V$_2$ and V$_3$. The disassembly bank 88 (a) disassembles the samples (Sample$_{N-1}$ through Sample$_0$) for each of the four decoder output vectors V$_0$, V$_1$, V$_2$ and V$_3$ back into the exposed color information (e.g., the S signals) for the stream of sets of samples 22 (e.g., in this example, "S=3 for RGB pixels") using the same permutation scheme as used on the transmit side and (b) crosses the reconstructed samples from the second clock domain back to the first clock domain. The stream of sets of reconstructed samples 22 is then provided to the retimer 32, which reformats the video signal. The output of the retimer 32 is therefore a recreation of the sequence of time-ordered sets of samples 22. The video sink 14 includes a bank of DACs 103 and a video display 85. The bank of DACs 103 is responsible for converting the samples 22 in the digital domain back into the analog domain. In one embodiment, a DAC 103 is provided for each row in the display 85. Once the samples 22 are converted into the analog domain, they are displayed on the video display 85 in a well-known manner.

SSVT RX 30 also includes a channel aligner 87 and a collector controller 89, which receives framing information and aperture information from each decoder 80. In response, the collector controller 89 coordinates the timing of the staging bank 86 and/or the disassembly bank 88 to ensure that all the samples presented to the disassembly bank come from a common time interval in which the level signals were sent by the SSVT TX 28. As a result, (a) the disassembly by the bank 88 may be delayed until all samples are received and (b) the individual channels of the transmission medium 34 do not necessarily have to all be the same length since the disassembly bank 88 compensates for any timing differences.

Figure 6:
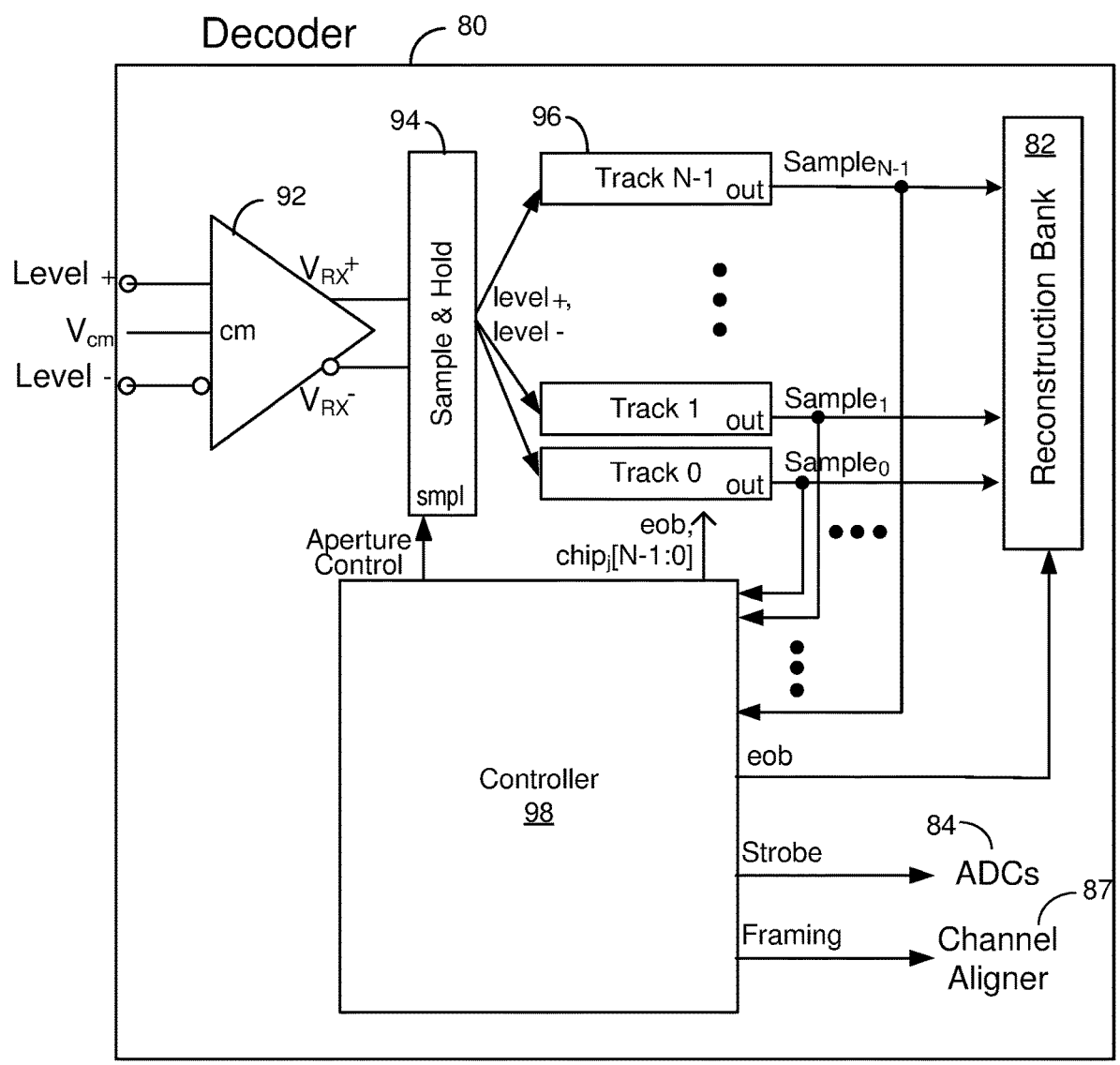
FIG. 6 is a logic diagram of N decoder tracks for de-modulating one differential pair of EM level signals accordance with a non-exclusive embodiment of the invention.

FIG. 6 is a logic diagram for one of the four decoders 80. The decoder 80 includes differential amplifier 92 and sample and hold circuit 94 arranged to receive, sample and hold one of the four differential EM level signals received over the transmission medium 34. The sampled EM level signals are then provided to each of N decoder track circuits 96 ($N_{n-1}$ through $N_0$). A sequencer controller 98 provides the same SSDS chip to each of N decoder track circuits 96 that was applied on the transmit side respectively. As a result, the sample outputs ($N_{n-1}$ through $N_0$) are provided to the reconstruction bank 82. Again, the same SSDS chip that was used on the transmit side is used by each of the decoder track circuits 96. As a result, the demodulated sample $N_{n-1}$ through $N_0$ is the same as prior to modulation on the transmit side.

The collector controller 89 is responsible for keeping track of any permutations and making sure that disassembly bank 88 applied the same permutation that was used in constructing the vectors $V_0$, $V_1$, $V_2$ and $V_3$ on the transmit side.

The collector controller 98 of each of the decoders 80 also generates a number of control signals, including a strobe signal, an end of bank (eob) signal, an aperture signal and a framing signal. The strobe signal is provided to the ADCs 84 and indicates the timing of when the analog-to-digital conversion process of a given reconstruction bank contents may begin. The eob signal is provided to the reconstruction bank 82 and signifies the timing for when the staging bank 86 is completely full with samples. When this occurs, the eob signal is asserted, clearing both the decoder tracks 96 and the staging bank 86 in anticipation of a next set of reconstructed samples ($N_{n-1}$ through $N_0$). The aperture control signal is provided to the sample and hold circuit 94, and the framing signal is provided to the channel aligner 87 and the collector controller 89.

Alternative Embodiment

In the above-described embodiment, the ADCs 84 convert the decoded samples into the digital domain and the DACs 103 in the video sink 14 convert the ordered sets of samples 22 back into the analog domain just prior to display.

Figure 5B:
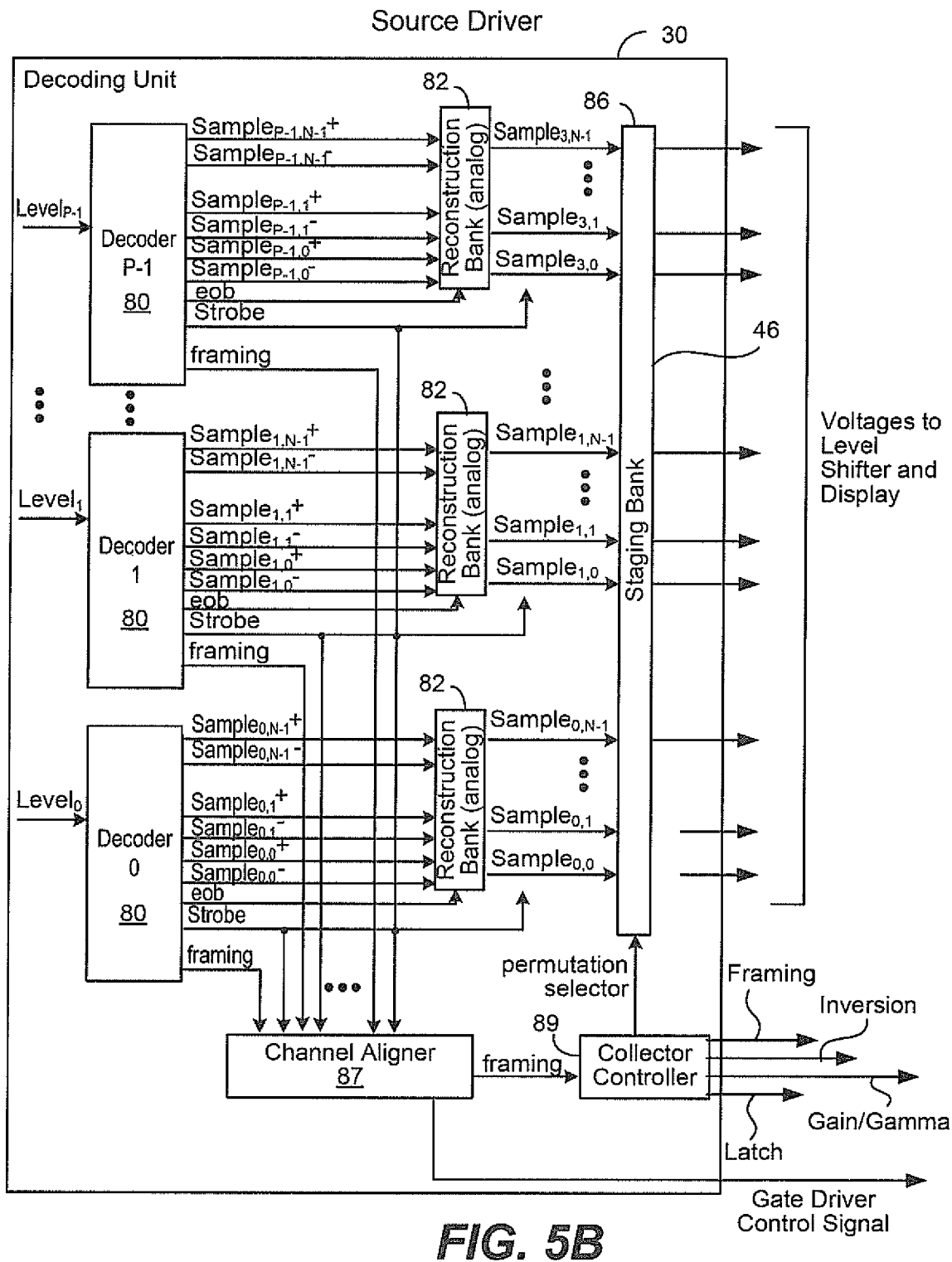
FIG. 5B is a logic block diagram illustrating another receiver assembly for de-modulating P received differential pairs of EM level signals in accordance with another non-exclusive embodiment of the invention.

As illustrated in FIG. 5B, an alternative embodiment is shown where the sample outputs from the reconstruction banks 82 remain in the analog domain, thus eliminating the need to for the DACs 103 and other componentry. With this embodiment, the ADCs 84, disassembly bank 88, and retimer 32 are optionally eliminated. Instead, the analog sample outputs are provided to the staging bank 86, which performs the same permutation on the samples used when the vectors $V_0$ through $V_3$ were constructed on the transmit side. The sample outputs of the staging bank 86 are then used to directly drive a display 85 of the video sink through an optional level shifter (not illustrated). Since different types of displays require different voltages used to drive their display panels, a level shifter may be used to scale the scale the voltages of the video sample outputs of the staging bank as needed. Any suitable level shifters may be used, as known in the art, such as latch type or inverter type.

With this embodiment, the collector controller 89 performs several functions. The collector controller 89 is responsible for keeping track and providing to the staging bank 86 the proper permutation selection to use. The collector controller 89 may also provide gain and gamma values to the display 85. Gain determines how much amplification is applied and the gamma curve relates the luminous flux to the perceived brightness, which linearizes human's optical perception of the luminous flux. The framing signal signifies the timing for constructing video frames on the display 85. The inversion signal may optionally be used to control the level shifter to invert or not invert the video sample outputs, as may be required by some types of display panels such as OLEDs. If a level shifter is used, the output of the level shifter is typically latched. In such embodiments, a latch signal may be used to control the timing of the latching and release of any level shifted the video sample output signals. Finally, the gate driver control signal is used to the gate driver circuitry typically used to drive the horizontal rows of many displays.

Figure 7:
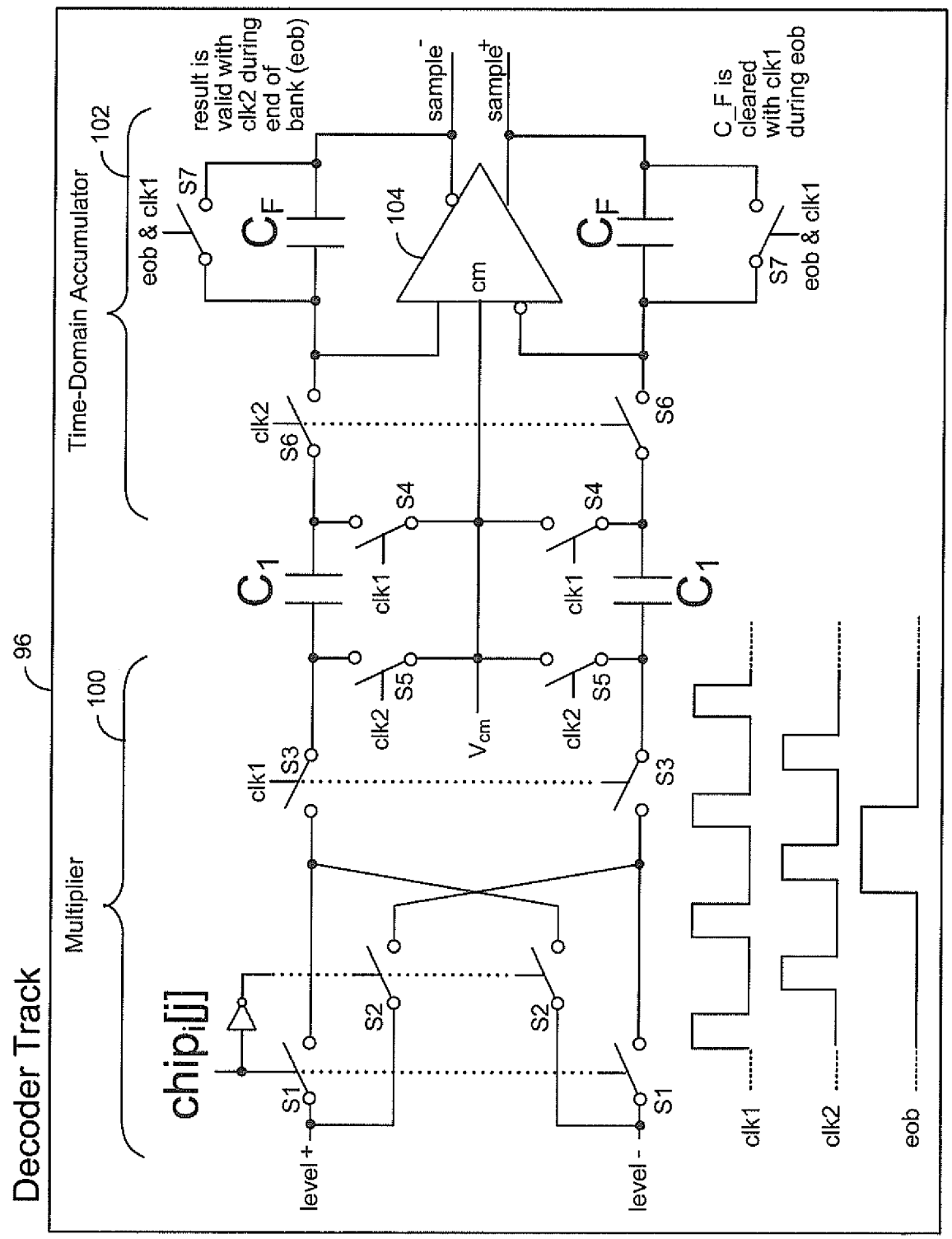
FIG. 7 is a circuit diagram of a representative decoder track circuit in accordance with a non-exclusive embodiment of the invention.

Referring to FIG. 7, a diagram of a representative decoder track circuit 96 is illustrated. The decoder track circuit 96 includes a multiplier portion 100 and an accumulator portion 102. The multiplier portion 100 includes a first pair of switches S1-S1, a second pair of switches S2-S2, a third pair of switches S3-S3 and a pair of capacitors C1-C1 on first (positive) and second (negative) power rails respectively. The accumulator portion 102 includes additional pairs of transistors S4-S4, S5-S5, S6-S6 and S7-S7, an operational amplifier 104, and a pair of capacitors CF and CF on the first (positive) and second (negative) power rails respectively.

For each demodulation cycle, a differential EM level signal pair is received at the first level input (level+) terminal and a second level input (level−) terminal. The differential EM level signal pair is demodulated in the multiplier portion 100 by conditionally inverting by multiplying by either (1) or negative (−1), depending on the value of the received SSDS chip.

If the SSDS chip has a value of (+1), then transistor pairs S1-S1 and S3-S3 close, while S2-S2 remain open, when clk 1 is active. As a result, the voltage values at the first level input (level+) terminal and the second level input (level−) are passed onto and stored by the two capacitors C1 and C1 on the positive and negative rails respectively. In other words, the input values are multiplied by (+1) and no inversion takes place.

If the SSDS chip has a value of −1, then the S1-S1 switches are both off, while the switches S2-S2 and S3-S3 are all turned on when clk 1 is active. As a result, the voltage values received at the positive or first (+) terminal and the negative or second (−) terminal are swapped. In other words, the input voltage value provided at the first or positive terminal is directed to and stored on the capacitor C1 on the lower negative rail, while the voltage value provided on the second or (−) terminal is switched to and stored on the capacitor C1 on the positive upper rail. The received voltage values at the input terminals are thereby inverted or multiplied by (−1).

When clk 1 transitions to inactive, the accumulated charge on C1 and C1 remain. When clk 2 transitions to active, then transistor pairs S4-S4 open while transistor pairs S5-S5 and S6-S6 close. The accumulated charge on the capacitors C1 on the upper or positive rail and C1 on the lower or negative rail are then provided to the differential inputs of the operational amplifier 104. The output of the operational amplifier 104 is the original +/− sample pair prior to encoding on the transmit side.

The accumulated charge on the two capacitors C1 and C1 are also passed on to the capacitors CF and CF on the upper or positive rail and the lower or negative rail when Clk 2 is active. With each demodulation cycle, the charges on the capacitors C1 and C1 on the upper and lower rails are accumulated onto the two capacitors CF and CF on the upper and lower rails, respectively. When clk 1 and the eob signal are both active, then the transistor pair S7-S7 are both closed, shorting the plates of each of the capacitors CF and CF. As a result, the accumulated charge is removed, and the two capacitors CF and CF are reset and ready for the next demodulation cycle.

Since each decoder 80 has N decoder track circuits 96, N decoded or original +/− sample pairs are re-created each decoding cycle. These N +/−sample pairs are then provided to the reconstruction bank 82, ADCs 84, and then the collector 46, including the staging bank 86 and the disassembly bank 88, and finally the retimer 32. As a result, the original set of samples 22 is re-created with its original color content information (e.g., S=3 for RGB) and ready for display on the display 85 of the video sink 14.

The decoder track 96 reconstructs incoming levels into samples over a succession of L cycles, demodulating each successive input level with the successive SSDS chips of that track's code. The results of each of the L demodulations is accumulated on the feedback capacitor CF. When eob is asserted during clk 1 corresponds to the first demodulation cycle of the decoding cycle, CF is cleared after eob such that it can begin again accumulating from zero volts or some other reset voltage. In various non-exclusive embodiments, the value of L is a predetermined parameter. In general, the higher the parameter L the greater the SSDS process gain and the better the electrical resiliency of the transmission of the SSVT signals over the transmission medium 34. On the other hand, the higher the parameter L, the higher the required frequency for the application of the SSVT modulation, which may compromise the signal quality due to insertion losses caused by the transmission medium 34.

The above-described demodulation cycle is repeated over and over with each of the four decoders 80. The net result is the recovery of the original string of time-ordered sets of samples 22, each with their original color content information (i.e., a set of S samples). The sets of samples 22 are then processed and displayed on the display 85 of video sink 14 as is well known in the art. Alternatively, the recovered sets of samples 22 can be stored on the received side for display in a time-shifted mode.

Passive Multiply-Accumulator Decoder

In an alternative embodiment, a passive multiply-accumulator decoder may optionally be used in the decoder blocks 80 as described with respect to FIG. 5A. As described in detail below, the passive multiply-accumulator processes groups of (L) differential pairs of samples of video media that are received over the transmission medium 34, where (L) is the length of the SSDS code used for encoding the media prior to transmission. This decoder is passive since the correlation function is implemented by charge sharing across multiple capacitors which is equivalent to a normalized summing of the modulated values. This decoder is a multiply-accumulator because the product result of the (L) differential pairs of samples and their corresponding SSDS chip value are stored on multiple storage devices (e.g., capacitors) during the decoding process which are then shorted together to do a normalized sum.

Figure 8A:
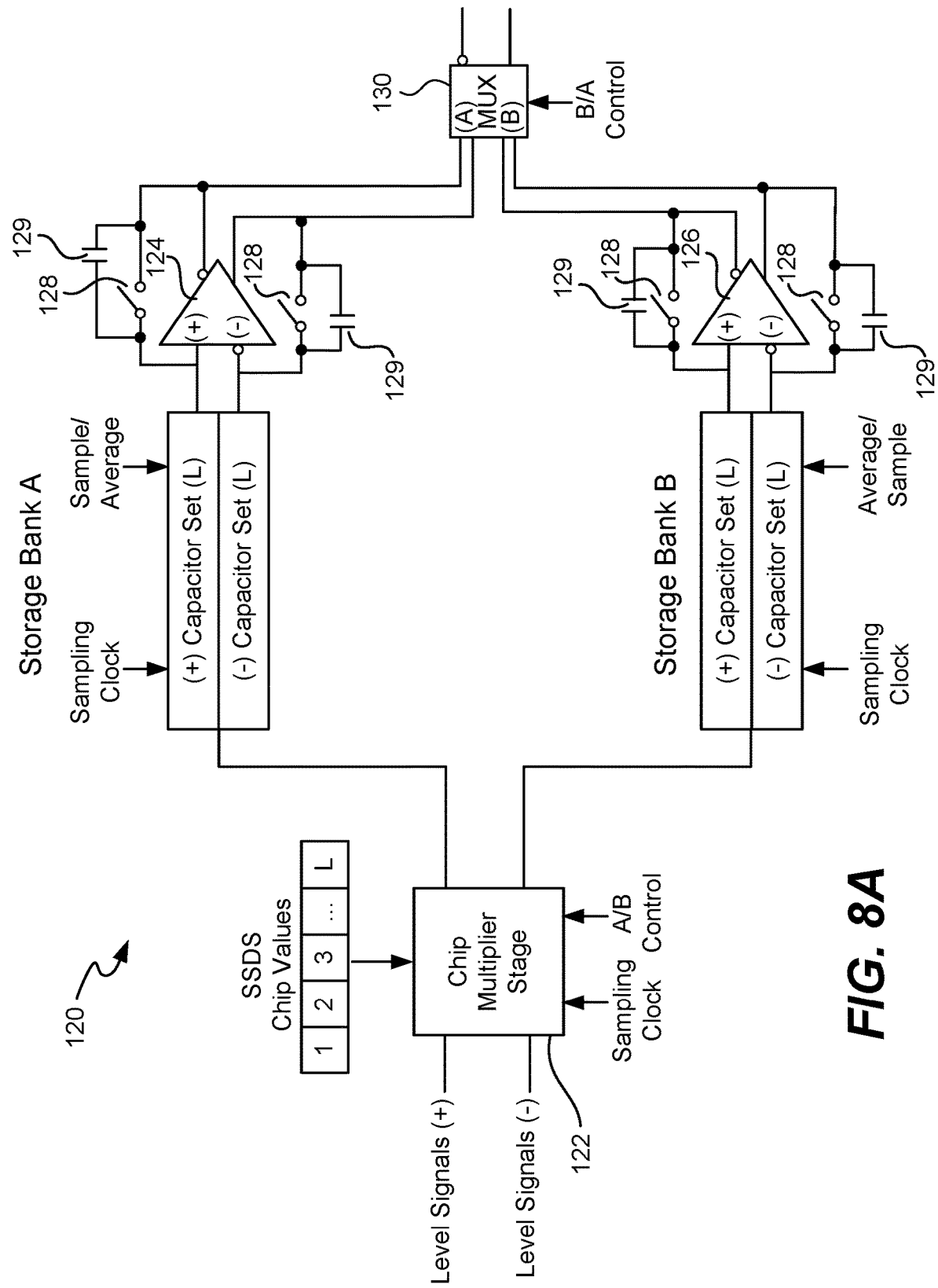
FIG. 8A is a circuit diagram of another decoder circuit for decoding SSDS encoded media signals in accordance with another non-exclusive embodiment of the invention.

Referring to FIG. 8A, a passive multiply-accumulator decoder 120 is illustrated. In accordance with one embodiment, the passive multiply-accumulator decoder 120 includes a chip multiplier stage 122, a first storage bank A, including a (+) set of (L) capacitors and a (−) set of (L) capacitors, and a first pair of capacitors 129.

A pair of reset elements 128 located on feedback paths coupled between the (+/−) outputs and (−/+) inputs of the differential amplifier 124 are also provided respectively. The reset elements 128 resets the feedback capacitor 129 to implement a switched capacitor amplifier.

The chip multiplier stage 122 is configured to sequentially receive over the transmission medium 34 L differential pairs of samples of video media that have been encoded by the encoder 28 using Spread Spectrum Direct Sequence (SSDS) coding as previously described. The chip multiplier stage 122 is also configured to receive SSDS chip values specified by the mutually-orthogonal SSDS codes used to encode the differential pairs of samples by the encoder 28 respectively. In a non-exclusive embodiment, the channel aligner 87 is responsible for applying the correct SSDS chip value to each of the received differential pair samples respectively and sequentially.

During operation, one differential pair sample is received with each clock cycle of the sampling clock Fssvt. In response to each received differential pair sample, the chip multiplier stage 122 performs the following:
 (1) Applies the SSDS chip value of the mutually-orthogonal SSDS code to the received differential pair sample;
 (2) Multiplies the differential pair sample with the applied chip value. Depending on the state of the applied chip value for a given differential pair sample, the multiplier is either (+1) or (−1). One non-restrictive application is, for example, if the chip value is a first state (e.g., "1"), the multiplier is (+1). If the chip value is a second state (e.g., "0"), then the multiplier is (−1); and
 (3) Stores voltage charges commensurate with the product result of the multiplication on a (+) and (−) pair of capacitors in the storage block A respectively. When the chip value is (+1), then the charges are stored without any inversion. If the chip value is (−1), then the charges are first inverted before storage. This inversion can be performed by a swapping the + and − input values of the input signals.

As (L) differential pairs of signals of video media are sequentially received, the above process is repeated with each sample. As a result, the (L) capacitors in the (+) and (−) sets are sequentially written to and store the charges commensurate with the multiplication product for the received (L) differential samples respectively.

Once (L) differential samples have been received and all of the (L) the capacitors of the (+) and (−) capacitor sets of the storage bank A have stored the multiplication product results, the passive multiply-accumulator decoder 120 operates to generate a decoded, differential, video media sample output (i.e., a Sample $_{P\text{-}1,\ N\text{-}1}$+, Sample $_{P\text{-}1,\ N\text{-}1}$−). This is accomplished with the assertion of an "averaging" control signal, which causes:
 (1) Interruption of the storage of multiplication product charges in capacitor bank A;

(2) The shorting of the charges on all (L) of the (+) capacitors in the storage bank A together, causing the accumulated charges to be "dumped" onto input of amplifier 124. The amplifier 124 responds by slewing its output to control the voltage on the input through a feedback mechanism via the first capacitor 129 coupled to the negative (−) output terminal of the differential amplifier 124. By dumping the accumulated charges on all of the (+) capacitors, an "average" voltage is realized on the output of the amplifier 124; and (3) The shorting of the charges on all (L) of the (−) capacitors in the storage bank A together, causing the accumulated charges to be "dumped" onto input of amplifier 124. The amplifier 124 responds by slewing its output to control the voltage on the input through a feedback mechanism via the second capacitor 129 coupled to the positive (+) output terminal of the differential amplifier 124. By dumping the accumulated charges on all of the (−) capacitors, an "average" voltage is realized on the output of the amplifier 124.

By simply shorting together all of the (+) capacitors and all of the (−) capacitors in the storage bank A, the average of the accumulated charge for the (L) incoming differential samples is provided on the output pair of amplifier 124 respectively. The averaging is thus essentially performed "for free," meaning the correlation process is done passively with minimal active components.

The decoded, differential, video media sample is thus represented by the difference between the average voltages on the positive and negative output terminals of the differential amplifier 124 respectively. The differential amplifier 124 acts to buffer the averaging process from external influences and depending upon the sizing of capacitors 129 relative to the capacitors in Storage Bank A which provide gain or attenuation, while suppressing any common voltage between the two. With the additional gain and buffering, the decoded, differential, video media sample is better suited to drive the reconstruction banks 82, as illustrated in FIG. 5A or 5B.

The frequency of the differential amplifier 124 does not need to operate at the same frequency Fssvt that is used for sampling the incoming the (L) differential samples. Since an averaging operation is performed for every (L) incoming samples, the frequency of the differential amplifier 124 need be only Fssvt/L. By reducing the speed/settling time requirements of the differential amplifier 124, the power required to perform the function is reduced as well as performing the averaging more precisely.

The reset circuits 128 for the differential amplifier 124 are provided to initialize or reset the voltage on the capacitors 129 to zero volts with each Fssvt/L cycle. Without a reset prior to each averaging operation, the differential amplifier 124 would average the previous value of L samples with the present average of L values, rather than simply amplifying the differential inputs it receives for a single averaging operation.

With the above-described embodiment, storage bank A cannot be used for storing multiplication product charges for incoming differential samples during averaging operations. As a result, processing delays may be incurred.

In an alternative embodiment, the passive multiply-accumulator decoder 120 may optionally also include a second storage bank B including (L) sets of (+) and (−) capacitors, a second differential amplifier 126, a second set of capacitors 129, a pair of reset circuits 128, and a multiplexor 130. The second storage bank B, the differential amplifier 126, second set of capacitors 129, and the reset circuits 128, all operate essentially the same as their counterparts as described above. A detailed explanation of these components is, therefore, not provided herein for the sake of brevity.

During operation, the two storage banks A and B are alternatively used. While one is sampling, the other is averaging, and vice-versa. By using one bank to sample while the other is averaging, processing delays are reduced in at least two ways. First, multiple sets of incoming (L) differential pairs of signals can be received, multiplied, and stored without interruption. Second, any speed/settling time requirements of the differential amplifiers following an averaging operation are effectively negated since one bank is always sampling while the other is averaging and vice versa.

To implement embodiments of the passive multiply-accumulator decoder 120 with two storage banks A and B, several control signals are required. These control signals include:

(1) A sample/average control signal that is provided to storage bank A, while a complementary average/sample signal is provided to storage bank B. Since these two control signals are complementary, one bank will always be sampling for the currently incoming set of (L) differential signals while the differential amplifier associated with the other storage bank is averaging, and vice-versa; and (2) A bank select control signal is provided to the multiplexer 130. Accordingly, when one bank is sampling and storing, the multiplexer 130 selects the differential amplifier output (either 124 or 126) of the other bank that is averaging. By transitioning the bank select control signal to coincide with transitions of the sample/average control signal, the output of the multiplexor 130 is always selected to pick the capacitor bank that is averaging. As a result, decoded, differential, video media samples are continually generated so long as the chip multiplier stage 122 is receiving incoming differential input signals.

Figure 9:
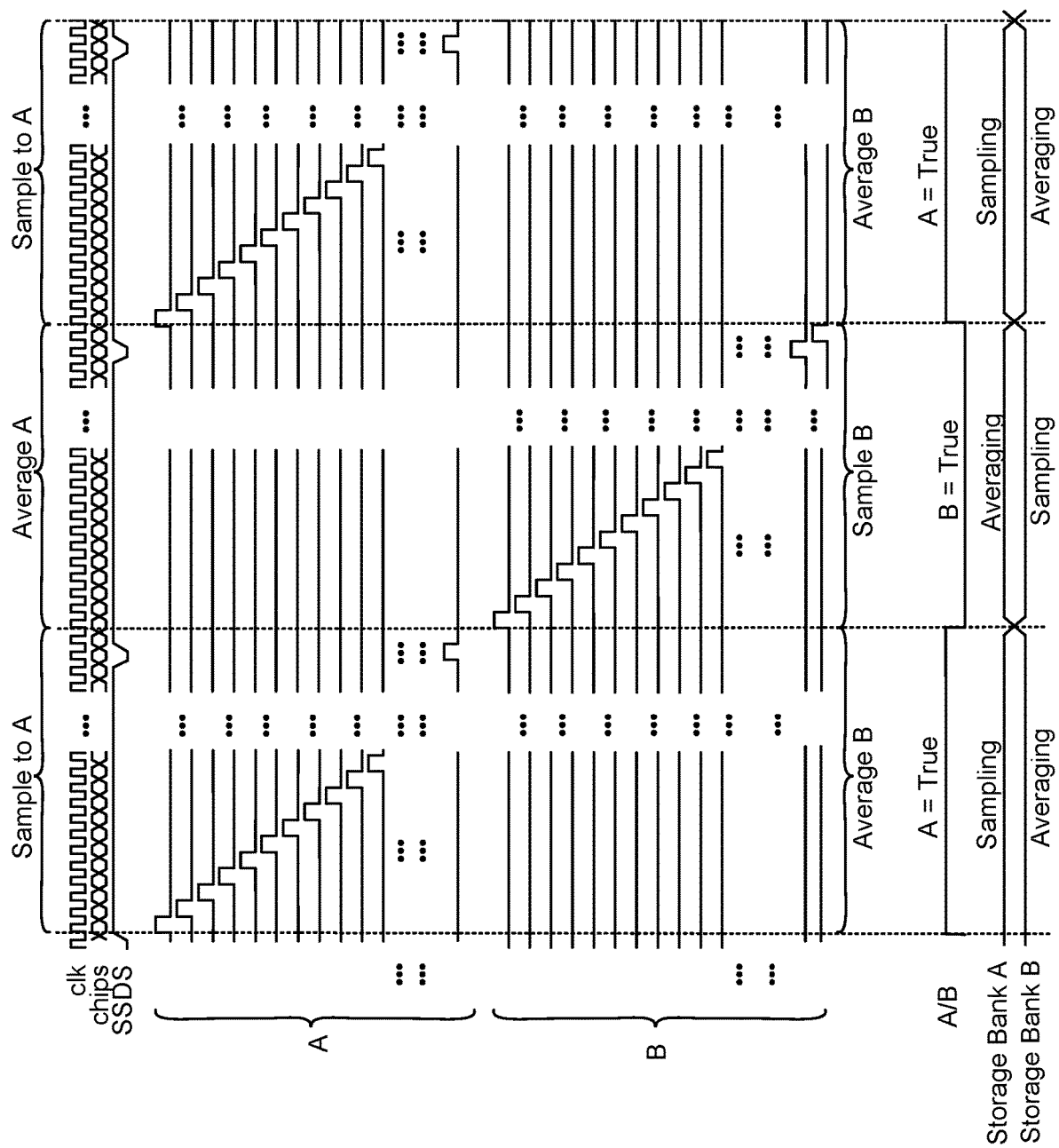
FIG. 9 is a timing diagram illustrating operation of the decoder circuit of FIG. 8A in accordance with a non-exclusive embodiment of the invention.

Referring to FIG. 9, a timing diagram illustrating the alternating nature of the operation of the two-bank embodiment of the passive multiply-accumulator decoder 120 is illustrated.

As evident in the diagram, the two capacitor banks A and B alternative between sampling and averaging. From left to right, the capacitor bank A initially samples, then averages and outputs results on the outputs of the differential amplifier 124, then samples again. Simultaneously, the capacitor bank B performs the complement, meaning it initially averages and outputs results to the differential amplifier 126, then samples, and then averages and outputs results to the differential amplifier 126. This alternating pattern is continually repeated by transitioning the state of the average/control signal every (L) clock cycles of Fssvt. As a result, a plurality of output, decoded, differential, video media samples are continually generated.

Figure 10:
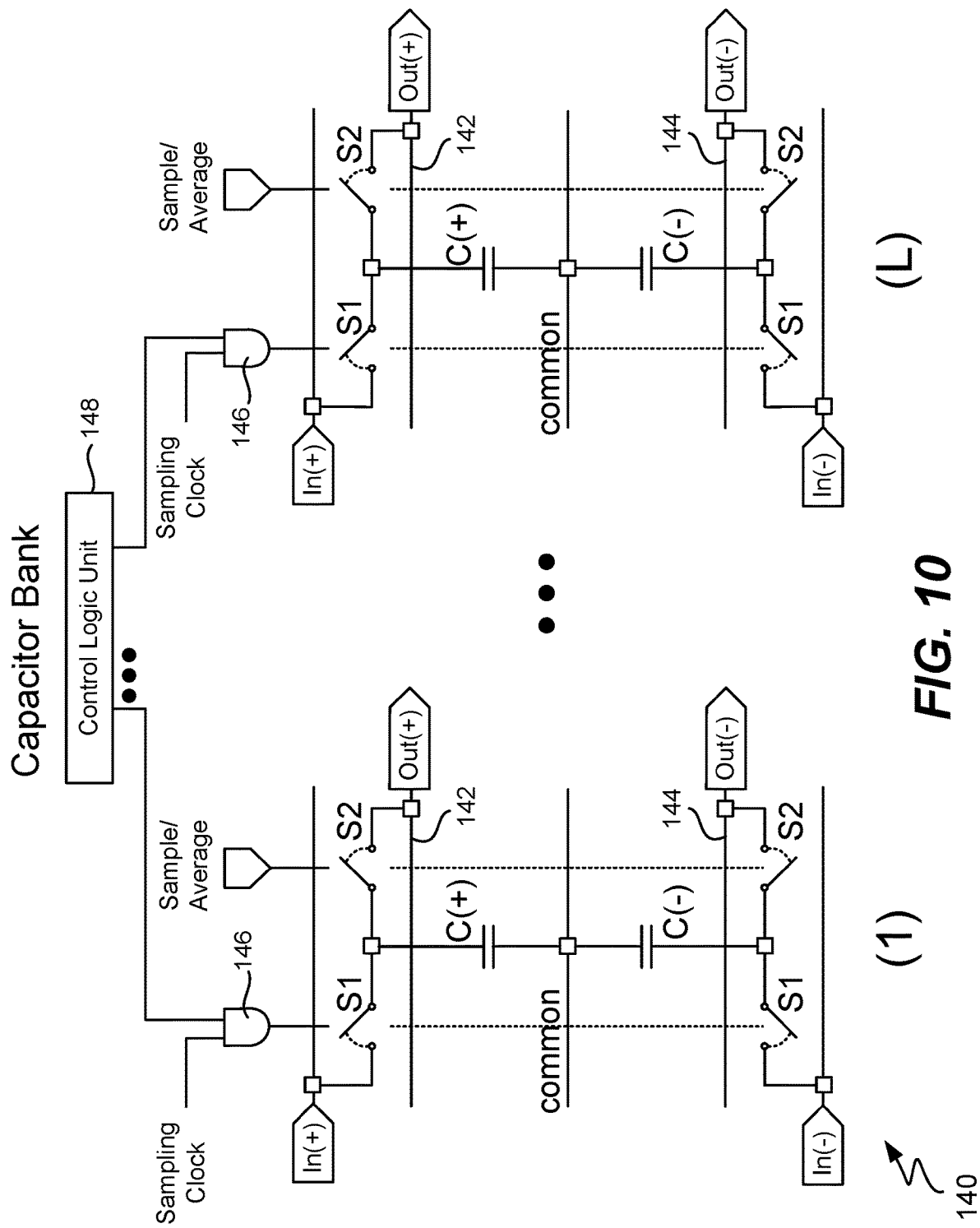
FIG. 10 illustrates a storage bank and control logic used in the decoder circuit of FIG. 8A in accordance with a non-exclusive embodiment of the invention.

Referring to FIG. 10, an exemplary storage bank 140 (e.g., either A or B) and control logic is illustrated. Using the above example with L=128, the storage bank 140 would include 128 stages, labeled in the drawing 1 through (L). Each stage includes a first pair of switches (S1-S1), a second pair of switches (S2-S2), and complementary capacitors C(+) and C(−).

Each stage is also configured to receive an output from a control logic unit 148 for controlling the opening/closing of the first pair of switches S1-S1. In a non-exclusive embodiment, the control logic unit 148 includes a circulating shift-register of (L) bits in length that circulates a single "1"

bit around to the (L) stages respectively. The position of the "1" bit at any point in time selects which of the (L) stages is to be used for sampling for the multiplication product of a given differential pair input. By circulating the "1" bit to substantially coincide with (L) Fssvt clock cycles, (L) samples are collected on the (L) stages respectively. In various alternative embodiments, the pulse width of the single "1" bit may be the same or somewhat less than the pulse width of the Fssvt clock. By using a smaller pulse width, any overlap between sampling capacitors of adjacent stages (L) being partially on is avoided or mitigated.

Each stage also has an input terminal configured to receive either the sample/average control signal for capacitor bank A, or the complementary average/sample control signal for capacitor bank B. With both banks, this control signal is used for controlling the opening/closing of the second set of switches S2-S2.

During sampling, the sample/average for capacitor bank A (or average/sample for capacitor bank B) signal is held in the sampling state. As a result, the switches S2-S2 remain open.

During sampling, the control logic unit 148 sequentially circulates the single "1" bit for the stages (L) through (1) respectively. As a result, only one stage is selected per Fssvt clock cycle. For the selected stage, the switches S1-S1 are closed, allowing the charge values commensurate with the multiplication product results for the currently received differential pair sample to be received and stored on the C(+) and C(−) capacitors of the selected stage respectively.

By circulating through all (L) stages, the charges commensurate with the multiplication product for (L) incoming differential signal pair samples that are received are stored on the (L) stages over (L) Fssvt clock cycles of respectively. Once all the (L) stages have accumulated their charges, an averaging operation is ready to be performed.

To initiate the averaging operation, the sample/average signal for storage bank A (or the average/sample signal for storage bank B) transitions to the averaging state and the control logic unit 148 stops the circulation of the "1" bit. As a result, the switches S1-S1 of all (L) stages are opened, and the switches S2-S2 of all (L) stages are closed. Consequently, the charge on the complementary capacitors C(+) and C(−) of all (L) stages is "dumped" (i.e., averaged) onto inputs of amplifier 124 at the (−) and (+) terminals of the corresponding differential amplifier respectively.

Note that during the "dumping"/averaging process, it is possible to connect another capacitor (previously initialized to have no charge) to the set of L capacitors to transfer a proportion of the result (the proportion depends on the ratio of the size of the extra capacitor to the sum of the L capacitors) to the extra capacitor. This technique provides the means to pass the result to the inputs of the corresponding differential amplifier, either 124 for bank A or 126 for bank B.

Although the storage banks A and B of FIG. 8A as described above are symmetrical and both include (L) stages, it should be understood that this is by no means a requirement. On the contrary, the A and B storage banks do not need to be complete replicas. There is only the need to have enough duplication to satisfy the requirement that a continuous stream of differential input samples can be handled. For instance, one or both storage banks may have fewer than (L) stages. In alternative embodiments, only a small number of stages in multiple storage banks need to be duplicated. The number of potential duplicate stages only needs to be sufficient to ensure completion of averaging operations into amplifier 124 outputs and sufficient time for that amplifier to drive through Mux 130 to deliver the result to the next circuit. Outputting of the result (by the amplifier) of one bank can be done during sampling of the next even though they share the storage elements, because the output amplifier "stands alone" after the evaluation is completed.

Figure 8B:
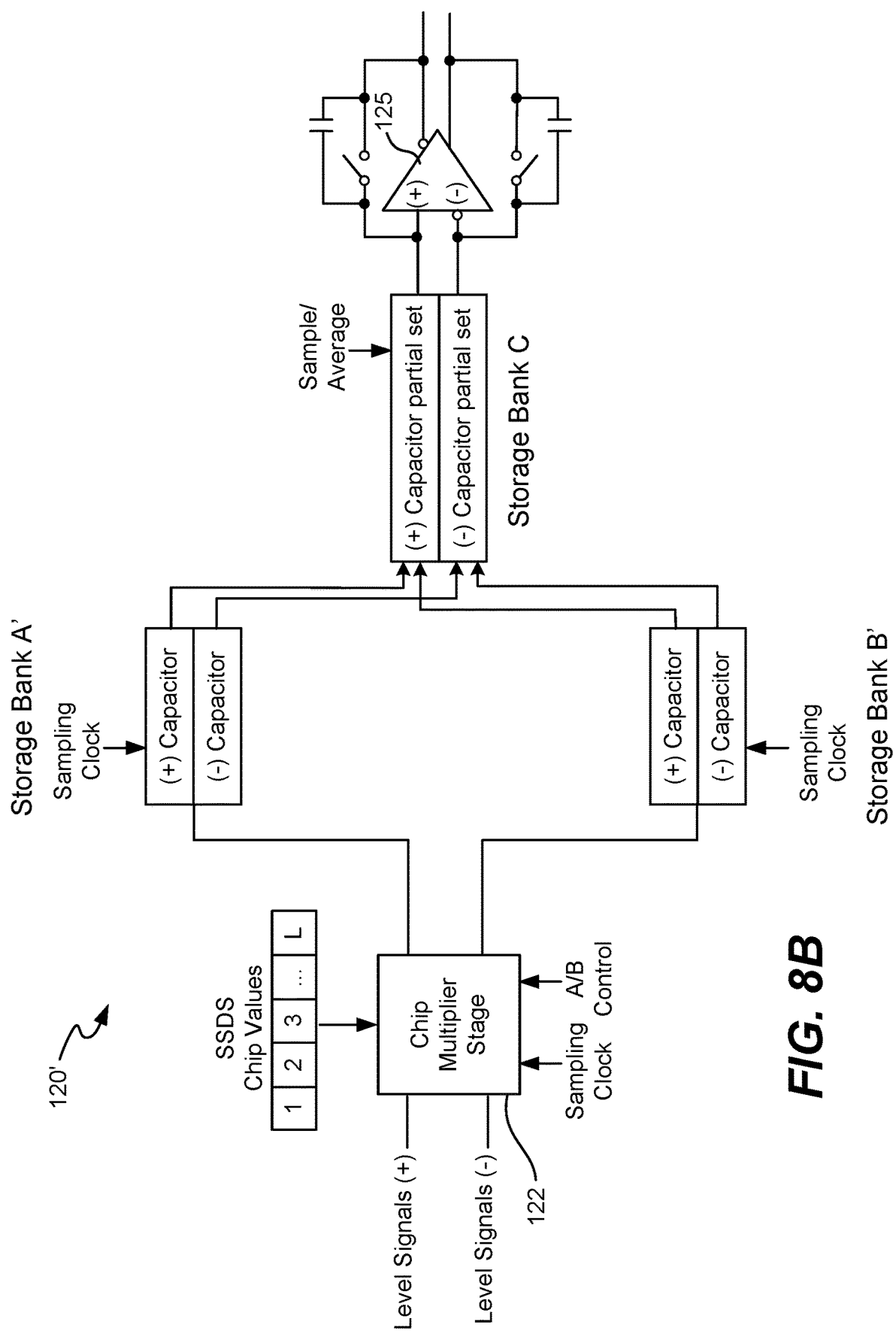
FIG. 8B illustrates a passive multiply-accumulator decoder that implements a partial pipelined approach in which a multiplexer is not required.

FIG. 8B illustrates a passive multiply-accumulator decoder 120' that implements a partial pipelined approach in which a multiplexer is not required. Only a small number of stages in storage banks A' and B' need to be duplicated. The number of potential duplicate stages only needs to be sufficient to ensure completion of averaging operations into amplifier 125 and sufficient time for that amplifier to settle in order to deliver the result to the next circuit. Accordingly, banks A and B from FIG. 8A are essentially "cut" and shortened to only contain fewer than L stages and result in banks A' and B' as shown. A new storage bank C is provided that includes the remaining stages, e.g., if banks A' and B' have (L-X) stages (X being a positive integer greater than 0), bank C will have X stages. Thus, as values from chip multiplier stage 122' are filling bank A' and bank C, and being sampled and output by amplifier 125, results from stage 122' are filling bank B' (allowing time for amplifier 125 to settle and output its voltages received via bank A'). Thus, banks A' and B' are sized such that when amplifier finishes outputting voltages via bank A', the results from bank B' (having been previously loaded) are loaded into bank C and bank B' continues to fill (and bank A' now begins to fill while bank B' results are output). The advantages are less duplication of circuitry, less chip area needed, only one amplifier needed and no multiplexor is needed.

The various above-described embodiments of the passive multiply-accumulator decoder 120 are essentially a "drop-in" replacement for the N decoders that are used in the decoder blocks 80 as illustrated in FIG. 5A and FIG. 5B. As previously described, N decoder circuits ($_{N0}$ through $_{N-1}$) are provided per decoder block 80. Each of the N decoder circuits is configured to sequentially receive differential level samples (+/− Level Signals). As the differential level signals are received, each of the N passive multiply-accumulator decoder circuits 120 applies the same unique SSDS code of the mutually-orthogonal SSDS code used for encoding for the level position (P) and sample position (N) on the transmit side. As a result, each of the passive multiply-accumulator decoder circuits 120 generates a differential pair of samples for its given P and N position. In other words from all of the N decoder circuits for each of the (P) decoders 80, a complete set of differential samples from (Sample $^{0+}$, sample $^{0-}$ to Sample $_{P-1, N-1}$+, Sample $_{P-1, N-1}$−) is generated and provided to the reconstruction banks 82 as shown in FIG. 5A and FIG. 5B. In the non-exclusive embodiment described with regard to FIG. 5A and FIG. 5B, and herein with respect to FIGS. 8A and 8B, N is 64 channels and the length of the SSDS code is L=128.

The above discussion of the various encoders and decoders are described with respect to differential signals. It should be noted, however, that this is by no means a requirement. In various alternative embodiments, the encoders and decoders can be configured to operate and process non-differential signals (i.e., a single signal) as well.

SSVT Analog and Digital Encoding, Decoding and Waveform

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals.

The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic (EM) video signals from a video source to a video sink over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread. Spectrum Direct Sequence (SSDS), encoding which relies on unique, orthogonal codes to encode each user's data. By using unique codes, the transmission of the multiple users can be combined and sent without interference between the users. On the receive side, the same unique or orthogonal codes are used for each user to demodulate the transmission, recovering the data of each user respectively. An SSVT signal is different from CDMA.

As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying a corresponding SSDS-based demodulation in order to reconstruct the samples that were encoded. As a result, the original stream of time-ordered video samples containing color and pixel-related information is conveyed from video source to video sink.

Figure 11:
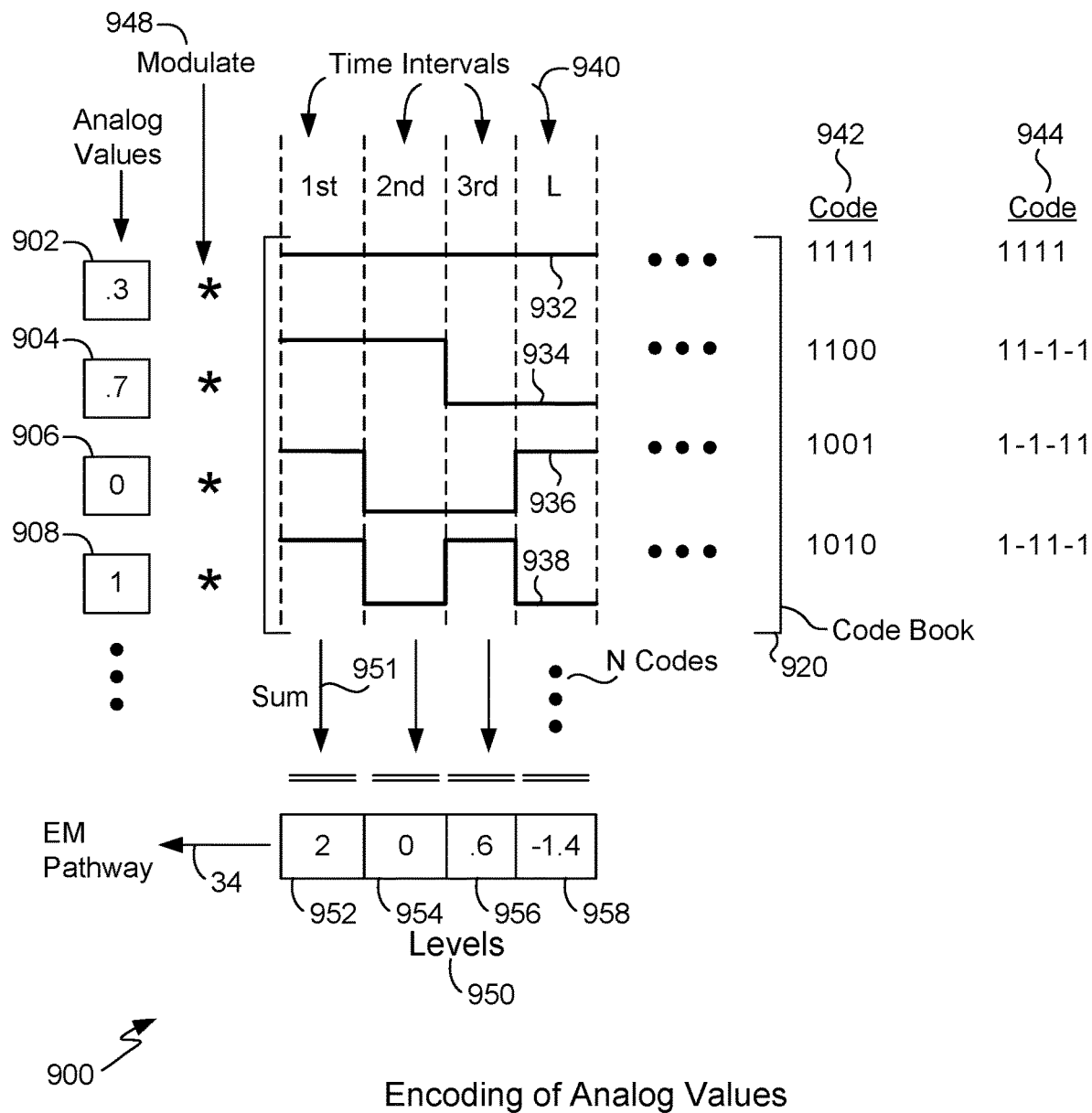
FIG. 11 illustrates an example showing how signal samples, in this case, analog values, are encoded within an encoder and then sent over an electromagnetic pathway.

FIG. 11 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of N entries in the code book.

As mentioned, code book 920 has any number of N codes 932-938; in this simple example the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter.

Therefore, in order to send the four analog values 902-908 (in this simple example) over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively sent in parallel over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates each sample by each chip in a corresponding code, and then sums those modulations at each time interval of the codes to obtain a resultant analog voltage level for each particular time interval. It is these analog output levels that are sent over a transmission medium, not representations of binary digits. Further, the present invention sends analog voltages from one video source to another video sink, i.e., from endpoint to endpoint. Unlike CDMA techniques which allow for multiple access by different people, different devices or different sources, the modulation and summing of samples of the present invention is used to compensate for loss of bandwidth introduced by SSDS techniques and sends a frame or frames of video information from a single video source to a single video sink, i.e., from single sensor (or multiple sensors) at a source to a single location at a sink.

Figure 12:
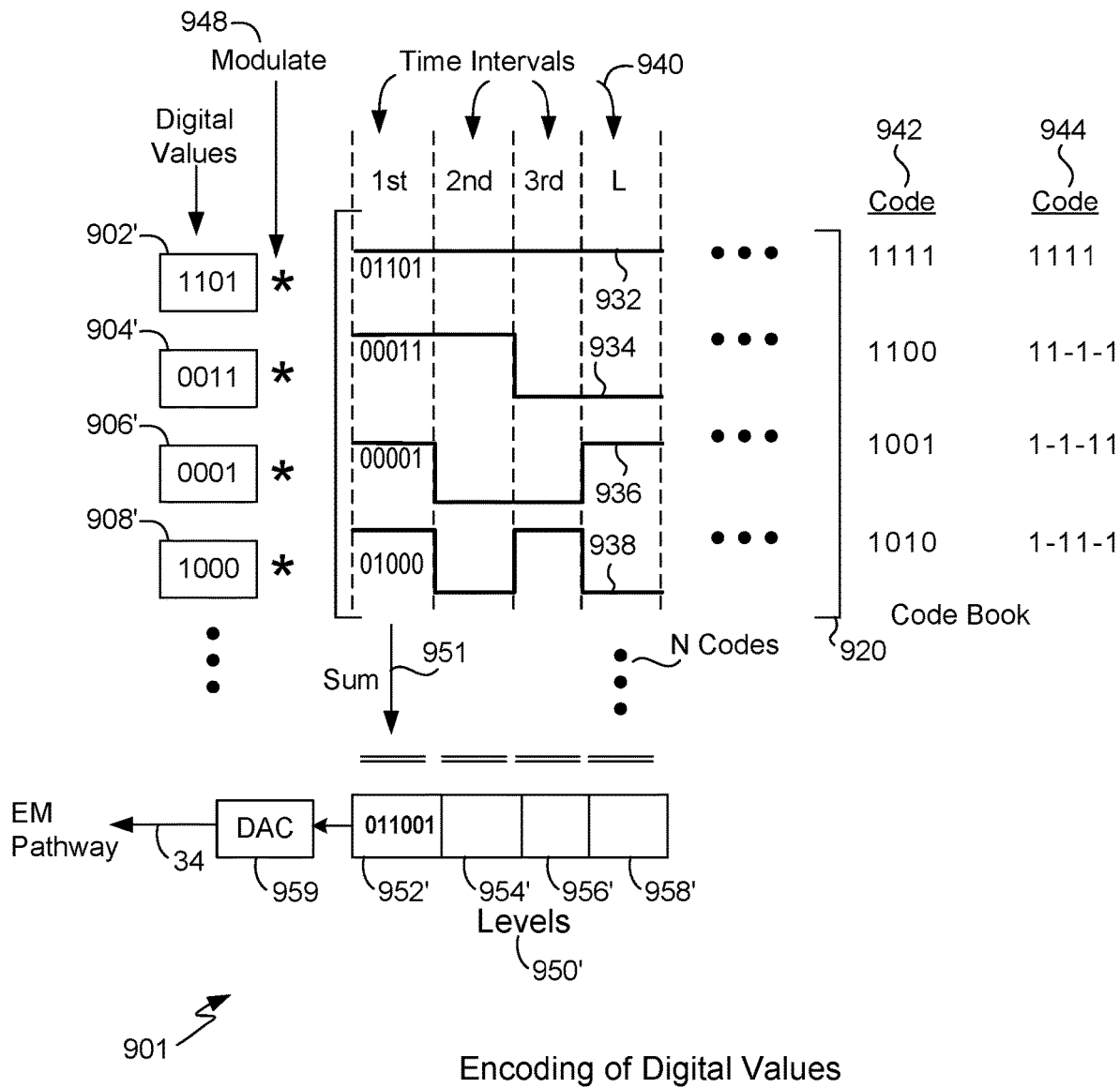
FIG. 12 illustrates a novel encoding technique as being applicable to signal samples that are digital values.

FIG. 12 illustrates this novel encoding technique as being applicable to signal samples that are digital values. Here, digital values 902'-908' are digital representations of voltages, i.e., binary digits that are transmitted and stored as bits. Using a different example of voltages, value 902' is "1101" value 904' is "0011," value 906' is "0001," and value 908' is "1000." Each digital value is modulated (digitally multiplied) by the representation 944 of each code, that is by "1" or by "–1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a –1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital encoding technique there will only be a total of L output levels to send, thus having an advantage.

Figure 13:
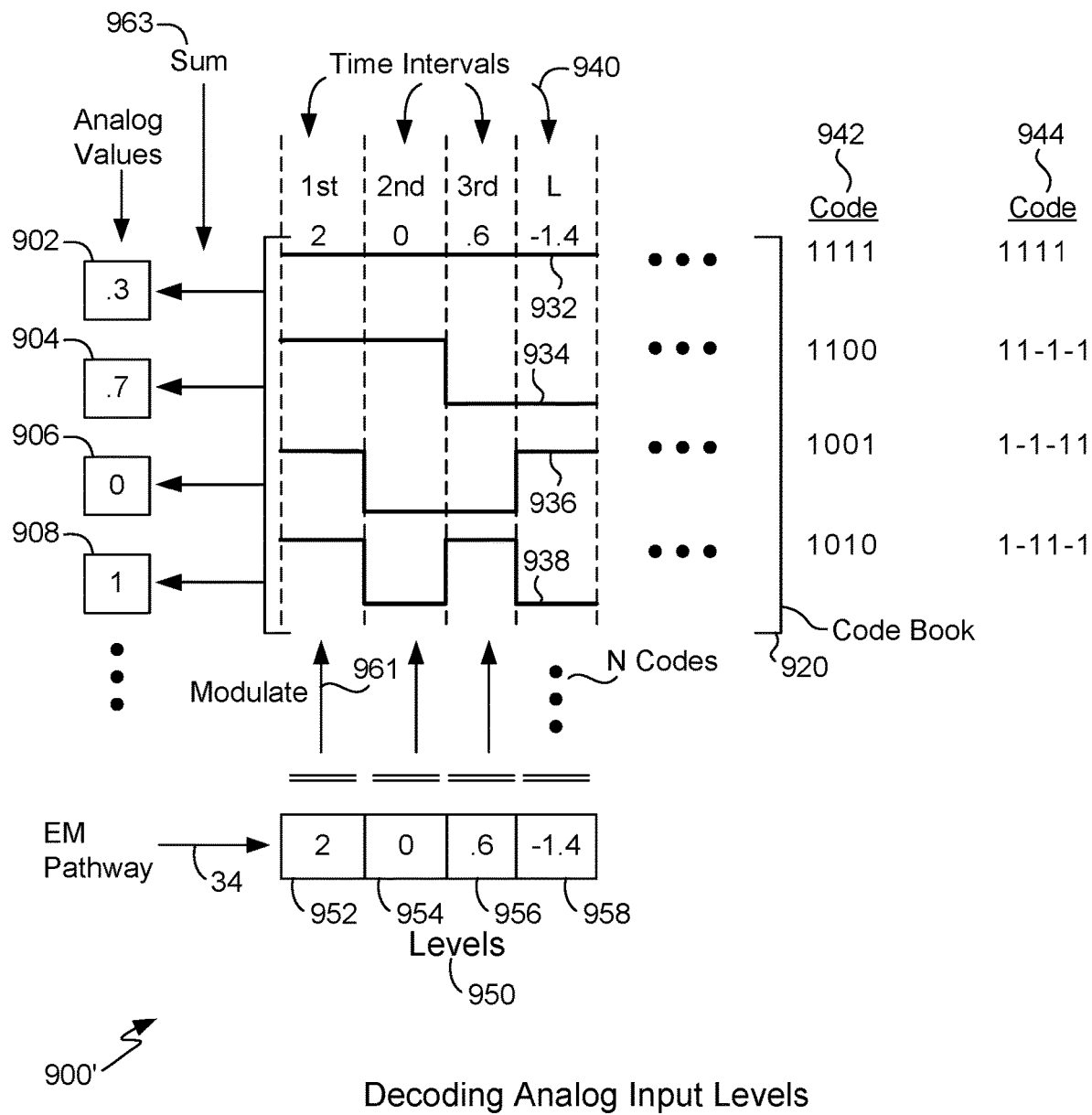
FIG. 13 illustrates decoding of analog input levels that were encoded using the encoder of FIG. 10.

FIG. 13 illustrates decoding of analog input levels that were encoded using the encoder of FIG. 11. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, –1.4". Modulation of levels 952-958 by the second code 934 produces the series of modulated values "2, 0, –0.6, 1.4". Modulation by the third code 936 produces "2, 0, –0.6, –1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 14A:
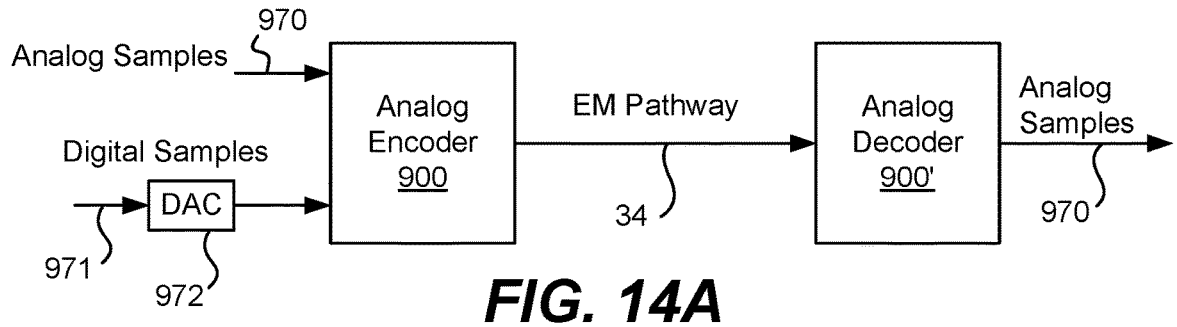
FIG. 14A illustrates use of an analog encoder and a corresponding analog decoder.
Figure 14B:
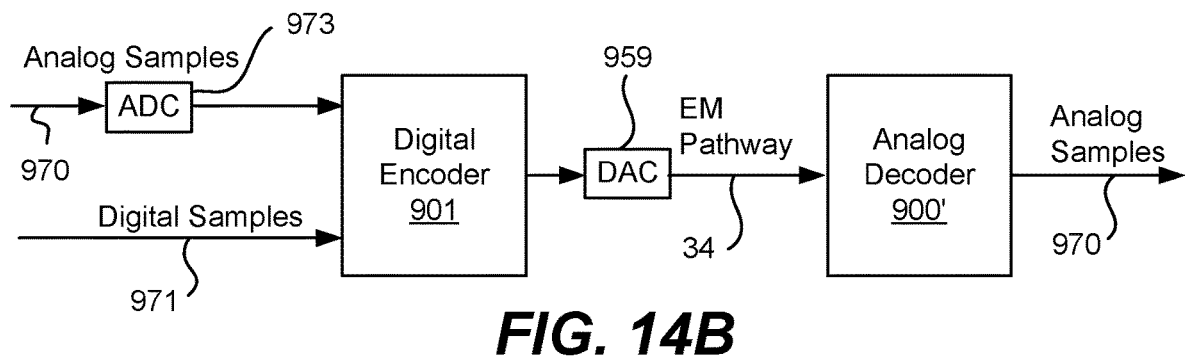
FIG. 14B illustrates use of a digital encoder and a corresponding analog decoder
Figure 14C:
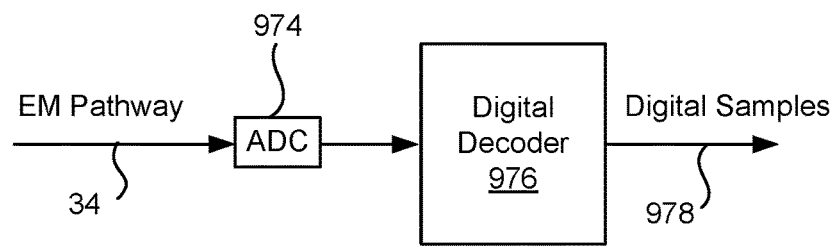
FIG. 14C illustrates use of a digital decoder to decode encoded analog signals that have arrived over an electromagnetic pathway.

FIGS. 14A, 14B and 14C illustrate that the encoders and decoders may operate upon either analog samples or digital samples; the various analog and digital encoders and decoders have previously been described above.

FIG. 14A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC.

FIG. 14B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC.

FIG. 14C illustrates use of a digital decoder to decode encoded analog signals that have arrived over an electromagnetic pathway on transmission medium 34. The encoded analog signals may been transmitted using either the analog encoder of FIG. 14A or the digital encoder of FIG. 14B. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 15:
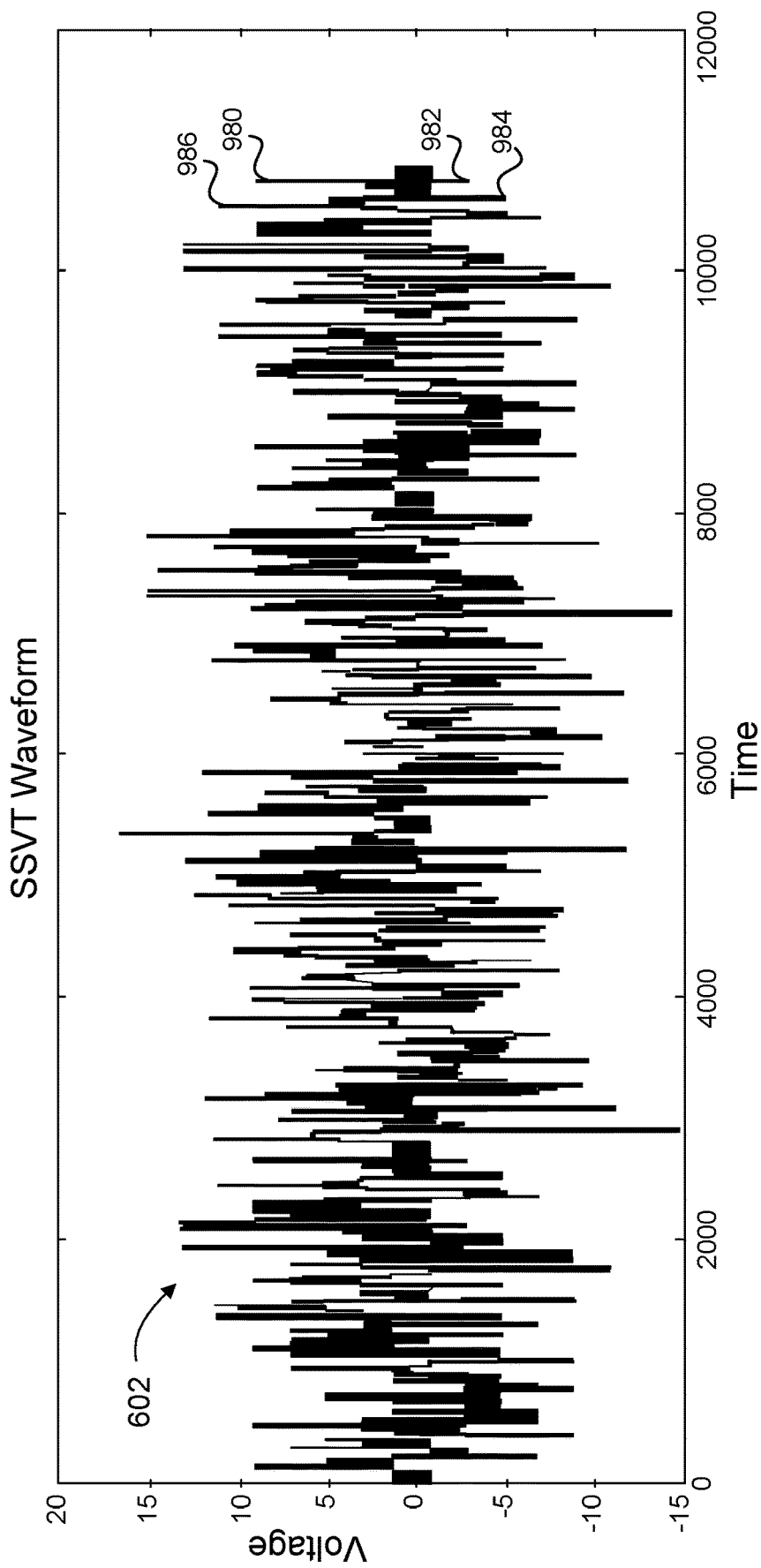
FIG. 15 shows a simulation of an SSVT waveform sent via an electromagnetic pathway.

FIG. 15 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example of FIG. 9, 32 codes are used, meaning that 32 samples may be transmitted in parallel; thus, voltage levels 980-986 (followed sequentially by the 28 subsequent voltage levels) form the transmission in parallel of 32 samples (such as pixel voltages from a video source). Subsequent to that transmission, the next 32 voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain decoded input levels at a decoder are normalized by a scale factor using the code length to recover the transmitted output levels as is known in the art.

CONCLUSION

The present embodiments should be considered illustrative and not restrictive and the invention is not to be limited to the details given herein, but may be modified within the scope and equivalents of the appended claims.

I claim:

1. A method of decoding differential input signals into a plurality of video samples, the method comprising:
    (a) receiving a differential input signal;
    (b) providing the differential input signal to each of N decoder tracks;
    (c) providing a Spread Spectrum Direct Sequence (SSDS) chip from each of N SSDS codes to each of the N decoder tracks respectively, each of the N SSDS chips having either a first state or a second state;
    (d) for each of the N decoder tracks, conditionally inverting or not inverting the differential input signal depending if the SSDS chip provided to each of the N decoder tracks is of the first state or the second state respectively;
    (e) for each of the N decoder tracks, storing the inverted or not inverted differential input signal at first and second storage locations;
    (f) iterating (a) through (e) j times, each iteration successively receiving a jth differential input signal and a jth chip from the SSDS code associated with said each decoder track, j iterating from 1 to L, wherein L>=N>=2, and accumulating the N stored differential input signals stored at the first and the second storage locations; and
    (g) generating a video output vector including N video samples, the N video samples derived from the accumulated N stored differential input signals stored at the first and the second storage locations of each of the N decoder tracks respectively.

2. The method of claim 1, further comprises multiplying the differential level signal by (+1) if the SSDS chip provided to the decoder track is of the first state or (−1) if the SSDS chip is of the second state.

3. The method of claim 1, wherein each of the N decoder tracks conditionally inverts or does not invert the differential input signal by multiplying by either (+1) or (−1) depending on if each SSDS chip provided to each of the N decoder tracks is of the first state or of the second state respectively.

4. The method of claim 1, further comprising for each of the N decoder tracks, operating a switching network during an active state of a first clock signal, the switching network responsible for switching the differential input signal to the first and the second storage locations, wherein the switching network selectively inverting or not inverting the differential input signal to the first and second storage locations depending on if the SSDS chip provided to each of the N decoder tracks is of the first state or the second state respectively.

5. The method of claim 4, further comprising presenting the plurality of N video samples during both an active state of a second clock signal and an end-of-bank signal.

6. The method of claim 1, further comprising sampling and holding the received differential input signal prior to providing to the N decoder tracks.

7. The method of claim 1, wherein the N video samples of the video output vector contain color information for one or more sets of samples for one or more pixels respectively.

8. A decoder for decoding differential input signals that have been encoded using Spread Spectrum Direct Sequence (SSDS) codes, the decoder comprising:
  N decoder tracks each configured to generate a differential sample output, wherein N>=2, each of the decoder tracks including:
  (a) first and second terminals configured to receive first and second voltage values of one of said differential input signals and a third terminal to receive an SSDS chip from an SSDS code associated with the decoder track, the SSDS chip having either a first state or a second state;
  (b) a multiplier circuit configured to demodulate the first and the second voltage values of the differential input signal by conditionally either inverting or not inverting the first and the second voltage values depending on the state of the SSDS chip; and
  (c) first and second storage devices configured to store the demodulated first and second voltage values respectively;
  (d) an accumulator circuit configured to accumulate the demodulated first and second voltage values stored on the first and the second storage devices, and having output terminals for presenting the differential sample output,
  wherein the N differential sample outputs are presented at the output terminals of the N encoder tracks respectively.

9. The decoder of claim 8, wherein the multiplier circuit is configured to demodulate the first and the second voltage values of the differential input signal by multiplying by (+1) or (−1) if the SSDS chip is the first state or the second state respectively.

10. The decoder of claim 8, wherein the multiplier circuit includes a first set of switches and a second set of switches, wherein the first set of switches and the second set of switches are complementary such that the first set of switches are closed while the second set of switches are opened and vice versa.

11. The decoder of claim 10, wherein the first set of switches and the second set of switches are coupled between the first and second terminals and the first and the second storage devices.

12. The decoder of claim 10, wherein the first set of switches are closed while the second set of switches are opened when the SSDS chip is of the first state and the multiplier circuit is multiplying by (+1) and the second set of switches are closed while the first set of switches are opened when the SSDS chip is of the second state and the multiplier circuit is multiplying by (−1).

13. The decoder of claim 8, wherein the first and second storage devices are first and second capacitors.

14. The decoder of claim 8, wherein each of the decoder tracks includes an operational amplifier selectively coupled between the output terminals and the first and the second storage devices.

15. The decoder of claim 8, wherein the multiplier circuit is arranged to perform the demodulation during a first active state of a first clock signal and the accumulator circuit is arranged to perform the accumulation during a second active state of a second clock signal.

16. The decoder of claim 8, further comprising a sample and hold circuit configured to sample and hold the differential input signal and to provide the differential input signal to each of the decoder tracks.

17. The decoder of claim 8, wherein the accumulator circuit being further configured to accumulate demodulated first and second voltage values of a total of L differential input signals received at the first and second terminals of each of the decoder tracks, wherein the SSDS chip used in demodulation corresponds to L, wherein L>=N>=2, and wherein the N differential sample outputs of the N decoder tracks represent a video output vector containing color information for N video samples.

* * * * *